United States Patent
Aoki et al.

(10) Patent No.: US 11,724,626 B2
(45) Date of Patent: Aug. 15, 2023

(54) VEHICLE SEAT AND ASSEMBLING METHOD THEREFOR

(71) Applicant: TS TECH CO., LTD., Asaka (JP)

(72) Inventors: Kazuya Aoki, Tochigi (JP); Kenta Kikuchi, Tochigi (JP); Kei Okuma, Tochigi (JP)

(73) Assignee: TS TECH CO., LTD.

( * ) Notice: Subject to any disclaimer, the term of this patent is extended or adjusted under 35 U.S.C. 154(b) by 0 days.

(21) Appl. No.: 17/782,503

(22) PCT Filed: Mar. 3, 2021

(86) PCT No.: PCT/JP2021/008119
§ 371 (c)(1),
(2) Date: Jun. 3, 2022

(87) PCT Pub. No.: WO2021/177342
PCT Pub. Date: Sep. 10, 2021

(65) Prior Publication Data
US 2022/0410775 A1      Dec. 29, 2022

(30) Foreign Application Priority Data

Mar. 6, 2020   (JP) .................................. 2020-038508
Mar. 6, 2020   (JP) .................................. 2020-038510

(51) Int. Cl.
*A47C 31/02*   (2006.01)
*A47C 7/74*    (2006.01)
(Continued)

(52) U.S. Cl.
CPC ............ *B60N 2/5825* (2013.01); *A47C 7/744* (2013.01); *B60N 2/5621* (2013.01)

(58) Field of Classification Search
CPC ...... B60N 2/5825; A47C 7/744; A47C 31/116
(Continued)

(56) References Cited

U.S. PATENT DOCUMENTS 7,261,371 B2 *   8/2007   Thunissen ................ B60N 2/56
                                            297/452.42
7,559,100 B2 *   7/2009   Pedde ..................... B60N 2/5825
                                            297/218.2 X
(Continued)

FOREIGN PATENT DOCUMENTS

JP    S 62-70849       5/1987
JP    H0645600 U       6/1994
(Continued)

OTHER PUBLICATIONS

PCT International Search Report, (w/ English translation) for corresponding PCT Application No. PCT7JP2021/008119, dated May 18, 2021, 5 pages.
(Continued)

*Primary Examiner* — Rodney B White
(74) *Attorney, Agent, or Firm* — Dority & Manning, PA

(57) ABSTRACT

A vehicle seat includes a pad having an air passage, a skin material, and a skin locking clip embedded in the pad and configured to tuck in a prescribed linear portion of the skin material. The pad includes a main body member in which the skin locking clip is embedded, an intermediate layer member arranged on the main body member, and a surface layer member arranged on the intermediate layer member. The main body member includes a linear bulging portion extending along the linear portion and bulging so as to define a plane substantially identical to a surface of the surface layer member, and the skin material is tucked in by the skin locking clip at a portion extending further from the surface layer member than the linear bulging portion.

8 Claims, 27 Drawing Sheets

(51) Int. Cl.
  *B60N 2/58* (2006.01)
  *B60N 2/56* (2006.01)
(58) Field of Classification Search
  USPC .................................................. 297/452.42
  See application file for complete search history.

(56) References Cited

U.S. PATENT DOCUMENTS

| | | | | |
|---|---|---|---|---|
| 8,038,222 | B2* | 10/2011 | Lein | B60N 2/5635 |
| | | | | 297/452.42 |
| 8,172,333 | B2* | 5/2012 | Pudenz | B60N 2/5825 |
| | | | | 297/452.42 |
| 9,669,744 | B2* | 6/2017 | Cao | B60N 2/5816 |
| 9,834,431 | B2* | 12/2017 | Agonia | B60N 2/5825 |
| 2006/0038432 | A1* | 2/2006 | Koehler | B60N 2/5635 |
| | | | | 297/180.1 |
| 2012/0174352 | A1 | 7/2012 | Tsunoda | |
| 2015/0165946 | A1* | 6/2015 | Taguchi | B60N 3/10 |
| | | | | 297/452.42 X |
| 2015/0328808 | A1* | 11/2015 | Sasaki | B60N 2/5825 |
| | | | | 264/46.4 |
| 2016/0129818 | A1 | 5/2016 | Sahashi | |
| 2016/0280105 | A1 | 9/2016 | Sato et al. | |
| 2016/0280106 | A1 | 9/2016 | Sato et al. | |
| 2017/0008436 | A1 | 1/2017 | Wyatt | |
| 2017/0043695 | A1* | 2/2017 | Kitamoto | B60N 2/7017 |
| 2017/0327017 | A1 | 11/2017 | Nagasawa et al. | |
| 2018/0022252 | A1* | 1/2018 | Arata | B60N 2/565 |
| | | | | 297/452.42 |
| 2018/0345832 | A1* | 12/2018 | Kumagai | A47C 7/74 |
| 2019/0143859 | A1* | 5/2019 | Sakoda | B60N 2/5657 |
| | | | | 297/218.1 |
| 2019/0232835 | A1* | 8/2019 | Murakami | B60N 2/56 |
| 2019/0368078 | A1* | 12/2019 | Booth | B60N 2/5825 |
| 2020/0031257 | A1 | 1/2020 | Okimura et al. | |
| 2021/0053472 | A1* | 2/2021 | Eldridge | A47C 31/023 |

FOREIGN PATENT DOCUMENTS

| | | |
|---|---|---|
| JP | H07163769 A | 6/1995 |
| JP | 2003-212019 | 7/2003 |
| JP | 2011069417 A | 4/2011 |
| JP | 3181196 U | 1/2013 |
| JP | 2013-147224 | 8/2013 |
| JP | 2016087196 A | 5/2016 |
| JP | 2016097948 A | 5/2016 |
| JP | 2016-186324 | 10/2016 |
| JP | 6228562 | 11/2017 |
| JP | 2018027176 A | 2/2018 |
| JP | 2018-51151 | 4/2018 |
| JP | 6339802 | 6/2018 |
| JP | 2019-206340 | 12/2019 |
| WO | WO 2015/030195 | 3/2015 |

OTHER PUBLICATIONS

Japanese Office Action (w/ English translation) for corresponding Japanese Application No. 2022007313, dated Feb. 7, 2023, 8 pages.

* cited by examiner

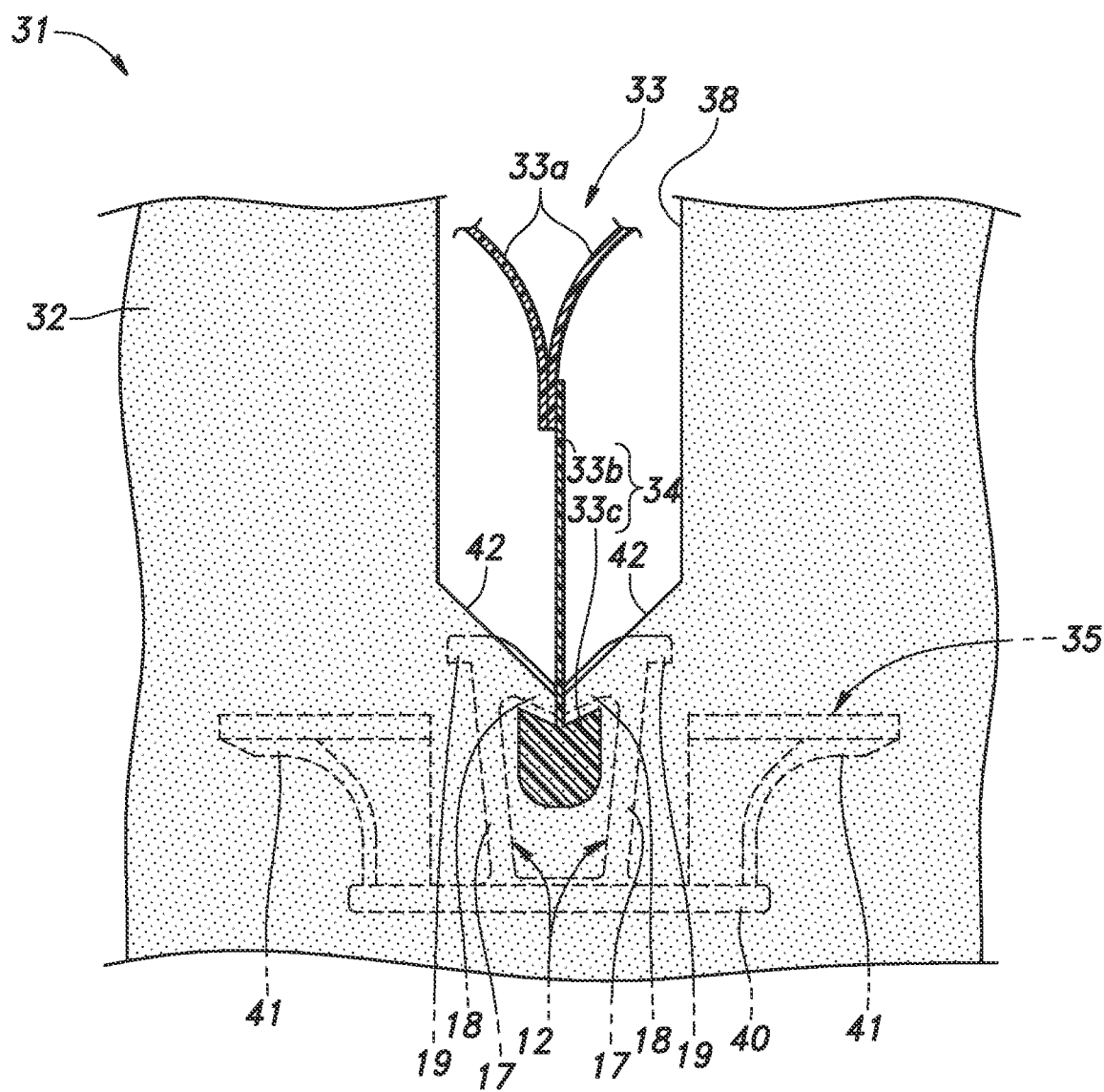

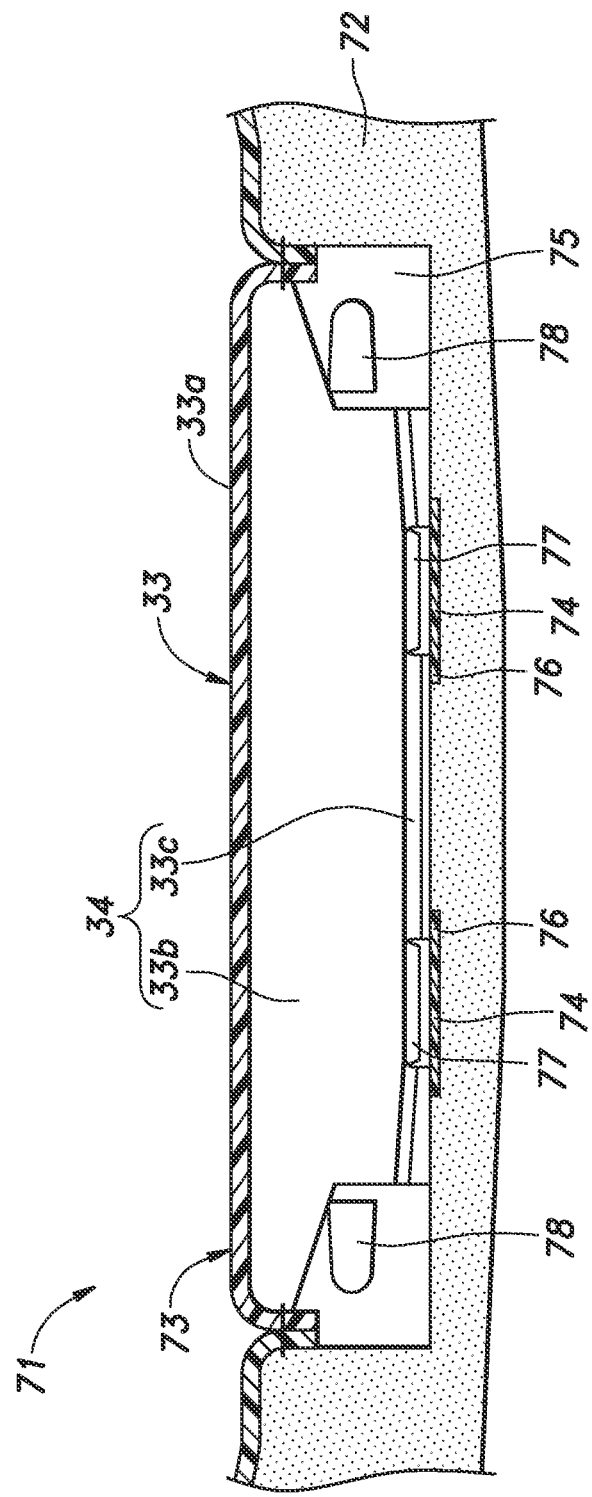

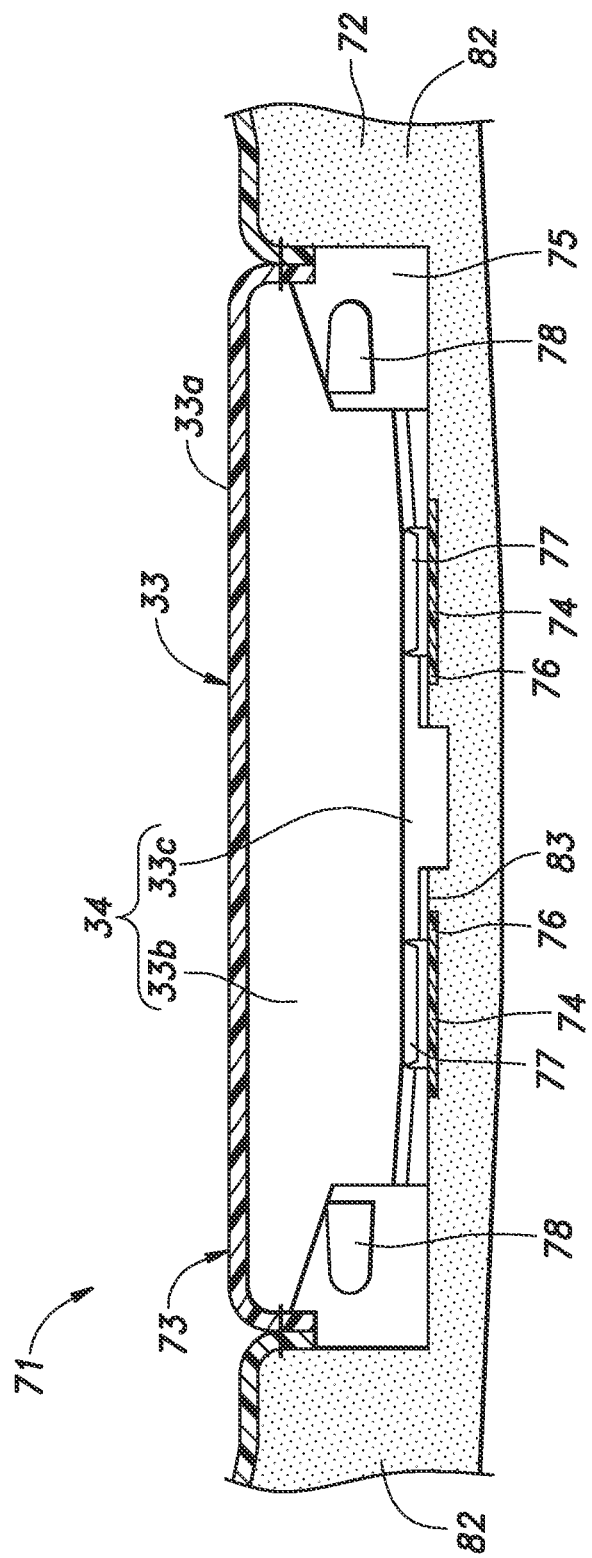

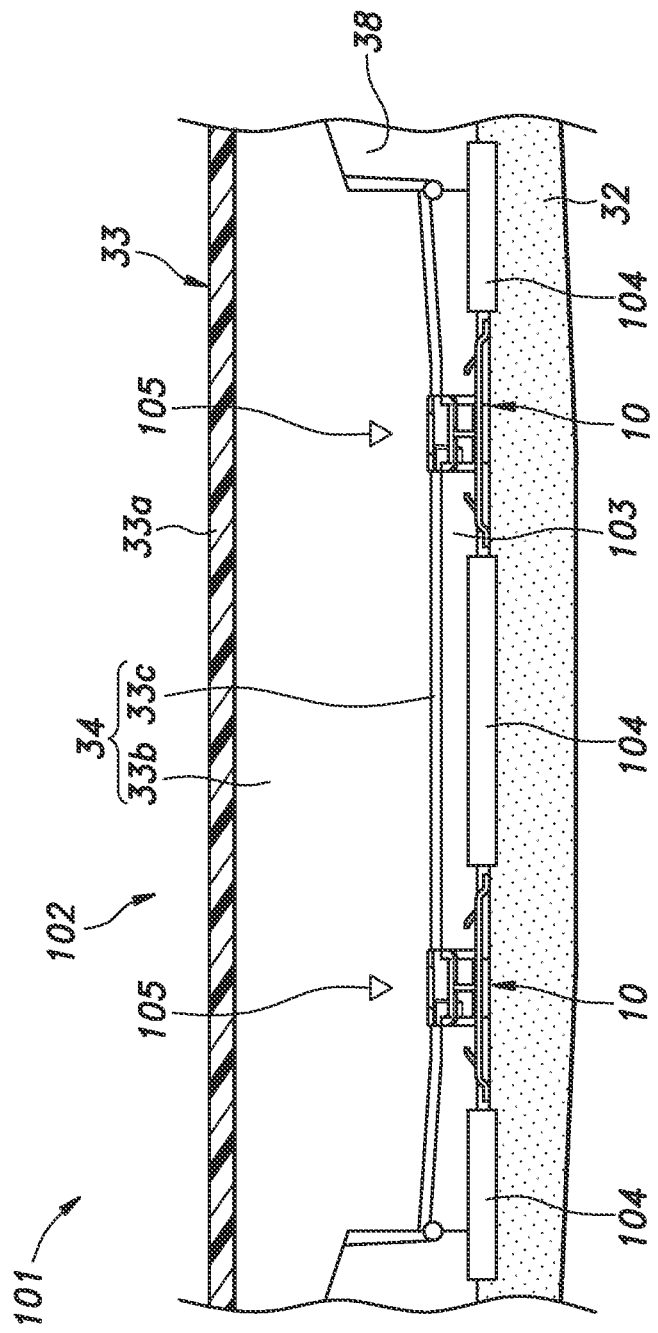

VEHICLE SEAT AND ASSEMBLING METHOD THEREFOR

CROSS REFERENCE TO RELATED APPLICATIONS

This application is the U.S. National Stage entry of International Application No. PCT/JP2021/008119 filed under the Patent Cooperation Treaty on Mar. 3, 2021, which claims priority to Japanese Patent Application No. 2020-038508 filed on Mar. 6, 2020 and Japanese Patent Application No. 2020-038510 filed on Mar. 6, 2020, all of which are incorporated herein by reference.

TECHNICAL FIELD

The present disclosure relates to a vehicle seat including a pad having an air passage, a skin material covering a surface side of the pad in a thickness direction thereof, and a skin locking clip embedded in the pad and configured to tuck in a prescribed linear portion of the skin material.

BACKGROUND ART

In some cases, seating surfaces of a seat cushion and a seat back of a vehicle seat are provided with linear recesses so as to maintain an appearance shape thereof (see FIG. 1). A skin material is tucked in the linear recesses and fixed to a pad by skin locking clips. For example, Patent Documents 1 and 2 each disclose a skin locking clip including a base plate embedded in a pad and a pair of locking portions erected on the base plate to lock the skin material.

Further, Patent Document 3 discloses a vehicle seat provided with an air ventilation system (AVS) that sends/sucks air to/from a surface of a seat via an air passage provided in a pad. The pad is formed by stacking a plurality of members so as to form the air passage.

PRIOR ART DOCUMENT(S)

Patent Document(s)

Patent Document 1: Japanese Patent No. 6228562
Patent Document 2: Japanese Patent No. 6339802
Patent Document 3: JP2019-206340A

SUMMARY OF THE INVENTION

Task to be Accomplished by the Invention

The pad consists of foaming resin such as urethane foam, and the skin locking clip is embedded in the pad at the foaming thereof. A surface layer portion of the pad having the air passage consists of a relatively thin pad member. If the skin locking clip is embedded in such a thin portion of the pad, the skin locking clip may not withstand the load and may disengage from the pad when the skin material is pulled.

In view of the above background, an object of the present invention is to provide a vehicle seat that includes a pad having an air passage, a skin material, and a skin locking clip, and can prevent the skin locking clip from disengaging.

Means for Accomplishing the Task

One aspect of the present invention provides a vehicle seat (51) including: a pad (52) having an air passage (55); a skin material (33) covering a surface side of the pad (52) in a thickness direction thereof; and a skin locking clip (35) embedded in the pad (52) and configured to tuck in a prescribed linear portion (34) of the skin material (33), wherein the pad (52) includes: a main body member (56) in which the skin locking clip (35) is embedded; an intermediate layer member (57) arranged on the main body member (56) and defining a portion (55b) of the air passage (55); and a surface layer member (58) arranged on the intermediate layer member (57) and defining the portion (55b) of the air passage (55) from the surface side, and the main body member (56) includes a linear bulging portion (59) extending along the linear portion (34) and bulging so as to define a plane substantially identical to a surface of the surface layer member (58), and the skin material (33) is tucked in by the skin locking clip (35) at a portion extending further from the surface layer member (58) than the linear bulging portion (59).

According to this aspect, the main body member includes a linear bulging portion extending along the linear portion and bulging so as to define a plane substantially identical to a surface of the surface layer member, and the skin material is tucked in by the skin locking clip at a portion extending further from the surface layer member than the linear bulging portion. Accordingly, the skin locking clip can be embedded in a thick portion of the pad, so that a vehicle seat that prevents the skin locking clip from disengaging can be provided.

In the above aspect, preferably, a linear shelf surface (61) extending along the linear bulging portion (59) is provided on one side of the linear bulging portion (59) opposite to another side of the linear bulging portion (59) where the skin material (33) is tucked in, and a first side surface (62) arranged on a base side of the linear shelf surface (61) of the linear bulging portion (59) and a second side surface (63) arranged on a tip side of the linear shelf surface (61) of the linear bulging portion (59) are defined, and the intermediate layer member (57) is arranged such that an edge thereof is substantially in contact with the first side surface (62), and the surface layer member (58) is arranged such that an edge thereof is substantially in contact with the second side surface (63).

According to this aspect, the linear bulging portion is provided with the linear shelf surface, the first side surface, and the second side surface, and the intermediate layer member is arranged such that an edge thereof is substantially in contact with the first side surface, and the surface layer member is arranged such that an edge thereof is substantially in contact with the second side surface. Accordingly, it is possible to prevent the skin locking clip from disengaging, and to easily position the intermediate layer member and the surface layer member.

In the above aspect, preferably, a portion of the skin locking clip (35) embedded in the main body member (56) is arranged closer to the linear portion (34) than an extension surface of the second side surface (63).

According to this aspect, a portion of the skin locking clip embedded in the main body member is arranged closer to the linear portion than an extension surface of the second side surface. Accordingly, the pad can firmly hold the skin locking clip.

In the above aspect, preferably, the skin locking clip (35) includes a base plate (40) embedded in the main body member (56) and a locking piece (12) extending from the base plate (40) toward the surface side in the thickness direction and engaging with the linear portion (34), and an extending end of the locking piece (12) is not embedded in the pad (52), and is arranged closer to the surface side in the thickness direction than a bottom surface of the surface layer member (58).

According to this aspect, an extending end of the locking piece of the skin locking clip is not embedded in the pad, and is arranged closer to the surface side in the thickness direction than a bottom surface of the surface layer member. Accordingly, the distance from the surface of the pad to the locking piece of the skin locking clip becomes relatively short, so that the linear portion can be easily attached to the skin locking clip.

Depending on the layouts of parts that compose a seat, the size of a skin locking clip needs to be reduced, in particular, the width of a base plate needs to be narrowed. Even in such a case, it is desirable that a pad firmly support the skin locking clip. An object of the present invention is to provide a skin locking clip that is firmly supported by a pad.

One aspect of the present invention provides a skin locking clip (10) embedded in a groove (8) of a pad (5) for fixing a locked portion (6*c*) of a skin material (6) that covers at least a portion of the pad (5), the groove (8) extending in a prescribed direction with a prescribed width and depth, the skin locking clip (10) comprising: a base plate (11) extending along the prescribed direction and a width direction of the groove (8) and embedded in the pad (5) at least at an end in the width direction; a pair of locking pieces (12) erected on the base plate (11) so as to be opposed to each other in the width direction for locking the locked portion (6*c*) and each including a locking claw (18) on a side where the locking pieces (12) are opposed to each other; and an overhanging piece (13) including an overhanging portion (21) opposed to the base plate (11) on an outside of at least one of the locking pieces (12) in the width direction.

According to this aspect, not only both ends of the base plate in the width direction but also the overhanging portion are embedded in the pad, so that the skin locking clip can be firmly supported by the pad.

In the above aspect, preferably, the overhanging piece (13) includes an erected portion (20) erected on the base plate (11), and the overhanging portion (21) extends outward in the width direction of the base plate (11) from a tip side of the erected portion (20).

According to this aspect, it is possible to easily form the pad such that the pad does not enter a space between the pair of locking pieces and the pad is filled in a portion surrounded by the base plate, the erected portion, and the overhanging portion.

In the above aspect, preferably, the erected portion (20) includes at least one pair of pillars (20*a*) extending from the base plate (11) at an interval in the prescribed direction, and an opening (23) is formed between the pillars (20*a*).

According to this aspect, the pad enters the opening, so that the skin locking clip can be firmly supported by the pad.

In the above aspect, preferably, the overhanging piece (13) further includes a reinforcement rib (22) connecting an intermediate portion of the overhanging portion (21) in the prescribed direction and the base plate (11).

According to this aspect, the overhanging portion is reinforced by the reinforcement rib, which is embedded in the pad, so that the skin locking clip can be firmly supported by the pad.

In the above aspect, preferably, the overhanging portion (21) has an opposed surface parallel to an opposed surface provided at an end of the base plate (11) in the width direction.

According to this aspect, the pad enters a space between the overhanging portion and the end of the base plate in the width direction, so that the skin locking clip can be firmly supported by the pad. Further, the opposed surfaces provided at the overhanging portion and the end of the base plate in the width direction are parallel to each other. Accordingly, a mold for forming the skin locking clip can be easily removed therefrom and complexity of the mold can be suppressed.

In the above aspect, preferably, a stepped portion (16) is provided at the end of the base plate (11) in the width direction, the stepped portion (16) being offset from a portion adjacent thereto in a depth direction of the groove (8).

According to this aspect, the pad enters the stepped portion, so that the skin locking clip can be firmly supported by the pad. Further, the shape for forming a step of the stepped portion improves the rigidity of the skin locking clip.

Further, in a conventional skin locking clip, there is play in a linear recess in a depth direction thereof in a state where a locked portion of a skin material engages with a locking portion of the skin locking clip, and thus the locked portion may swing in the skin locking clip. If design is changed to eliminate such play, it may be difficult for a worker to push in the locked portion. In view of the above background, an object of the present invention is to provide a skin locking clip that can facilitate an attachment of a locked portion of a skin material to a skin locking clip and can prevent the locked portion of the skin material from disengaging from the skin locking clip.

One aspect of the present invention provides a skin locking clip (10) embedded in a groove (8) of a pad (5) for fixing a locked portion (6*c*) of a skin material (6) that covers at least a portion of the pad (5), the groove (8) extending in a prescribed direction with a prescribed width and depth, the skin locking clip (10) comprising: a base plate (11) extending along the prescribed direction and a width direction of the groove (8) and embedded in the pad (5) at least at an end in the width direction; a pair of locking pieces (12) including a pair of wall bodies (17) erected on the base plate (11) so as to be opposed to each other in the width direction for locking the locked portion (6*c*) and a pair of locking claws (18) provided at tip portions of the wall bodies (17), wherein a biasing portion (14) is provided between the wall bodies (17) in the width direction, the biasing portion (14) biasing the locked portion (6*c*) locked by the locking pieces (12) in a direction away from the base plate (11).

According to this aspect, when the locked portion is pushed in, the biasing portion is deformed, so that the locked portion can be easily attached to the skin locking clip. Further, in a state where the skin locking clip locks the locked portion, the locked portion is held between the locking claws and the biasing portion. Accordingly, the locked portion does not swing in the skin locking clip, and is unlikely to disengage from the skin locking clip.

In the above aspect, preferably, the pair of locking claws (18) are offset from each other in the prescribed direction, and a distance in the width direction between the locking claw (18) of one of the locking pieces (12) and the wall body (17) of another of the locking pieces (12) is smaller than a width of the locked portion (6*c*), and the locking pieces (12) are elastically deformable such that the distance becomes equal to or more than the width of the locked portion (6*c*).

According to this aspect, in a state where the skin locking clip locks the locked portion, the locking pieces can lock the locked portion. Further, the locking claws are offset from each other in the prescribed direction, so that a worker can easily make a distance between upper ends of the pair of locking pieces larger than the width of the locked portion by rotating the locked portion, thereby disengaging the locked portion from the skin locking clip.

In the above aspect, preferably, the skin locking clip (10) is made of resin, and the biasing portion (14) includes a pair of leaf springs supported by the base plate (11) in a cantilevered manner.

According to this aspect, the biasing portion can be formed integrally with the base plate.

In the above aspect, preferably, the pair of leaf springs are provided outside the locking claws (18) in the prescribed direction and offset from each other in the width direction.

According to this aspect, the direction in which a mold is removed can be secured when the skin locking clip is formed, and the complexity of the mold can be suppressed.

In the above aspect, preferably, each of the locking pieces (12) includes a guide portion (19) extending outside in the width direction from the tip portion of the wall body (17), and upper surfaces of the locking claw (18) and the guide portion (19) in the depth direction are smoothly continuous with each other and inclined downward toward an inside in the width direction.

According to this aspect, when the locked portion is pressed on upper portions of the locking pieces so that the locked portion is locked by the skin locking clip, the guide portion guides the locked portion to a space between the pair of locking pieces and the locked portion can be inserted between the upper portions of the pair of locking pieces even if the position of the locked portion is offset in the width direction.

Effect of the Invention

According to one aspect of the present invention, the main body member includes a linear bulging portion extending along the linear portion and bulging so as to define a plane substantially identical to a surface of the surface layer member, and the skin material is tucked in by the skin locking clip at a portion extending further from the surface layer member than the linear bulging portion. Accordingly, the skin locking clip can be embedded in a thick portion of the pad, so that a vehicle seat that prevents the skin locking clip from disengaging can be provided.

According to one aspect of the present invention, the linear bulging portion is provided with the linear shelf surface, the first side surface, and the second side surface, and the intermediate layer member is arranged such that an edge thereof is substantially in contact with die first side surface, and the surface layer member is arranged such that an edge thereof is substantially in contact with the second side surface. Accordingly, it is possible to prevent the skin locking clip from disengaging, and to easily position the intermediate layer member and the surface layer member.

According to one aspect of the present invention, a portion of the skin locking clip embedded in the main body member is arranged closer to the linear portion than an extension surface of the second side surface. Accordingly, the pad can firmly hold the skin locking clip.

According to one aspect of the present invention, an extending end of the locking piece of the skin locking clip is not embedded in the pad, and is arranged closer to the surface side in the thickness direction than a bottom surface of the surface layer member. Accordingly, the distance from the surface of the pad to the locking piece of the skin locking clip becomes relatively short, so that the linear portion can be easily attached to the skin locking clip.

BRIEF DESCRIPTION OF THE DRAWING(S)

FIG. 9 is a cross-sectional view showing a tuck-in portion of a vehicle seat according to a second embodiment (in a cross-section perpendicular to an extending direction of a groove);

FIG. 16 is a cross-sectional view showing the tuck-in portion of the vehicle seat (in a cross-section along a line XVI-XVI in FIG. 15) according to the fourth embodiment;

FIG. 17 is a cross-sectional view showing a tuck-in portion of a vehicle seat according to a modified embodiment of the fourth embodiment;

FIG. 27 is a cross-sectional view showing a tuck-in portion of a vehicle seat according to a sixth embodiment (in a cross-section perpendicular to the width direction of a groove).

MODE(S) FOR CARRYING OUT THE INVENTION

In the following, an embodiment of the present invention will be described with reference to the drawings.

Figure 1:
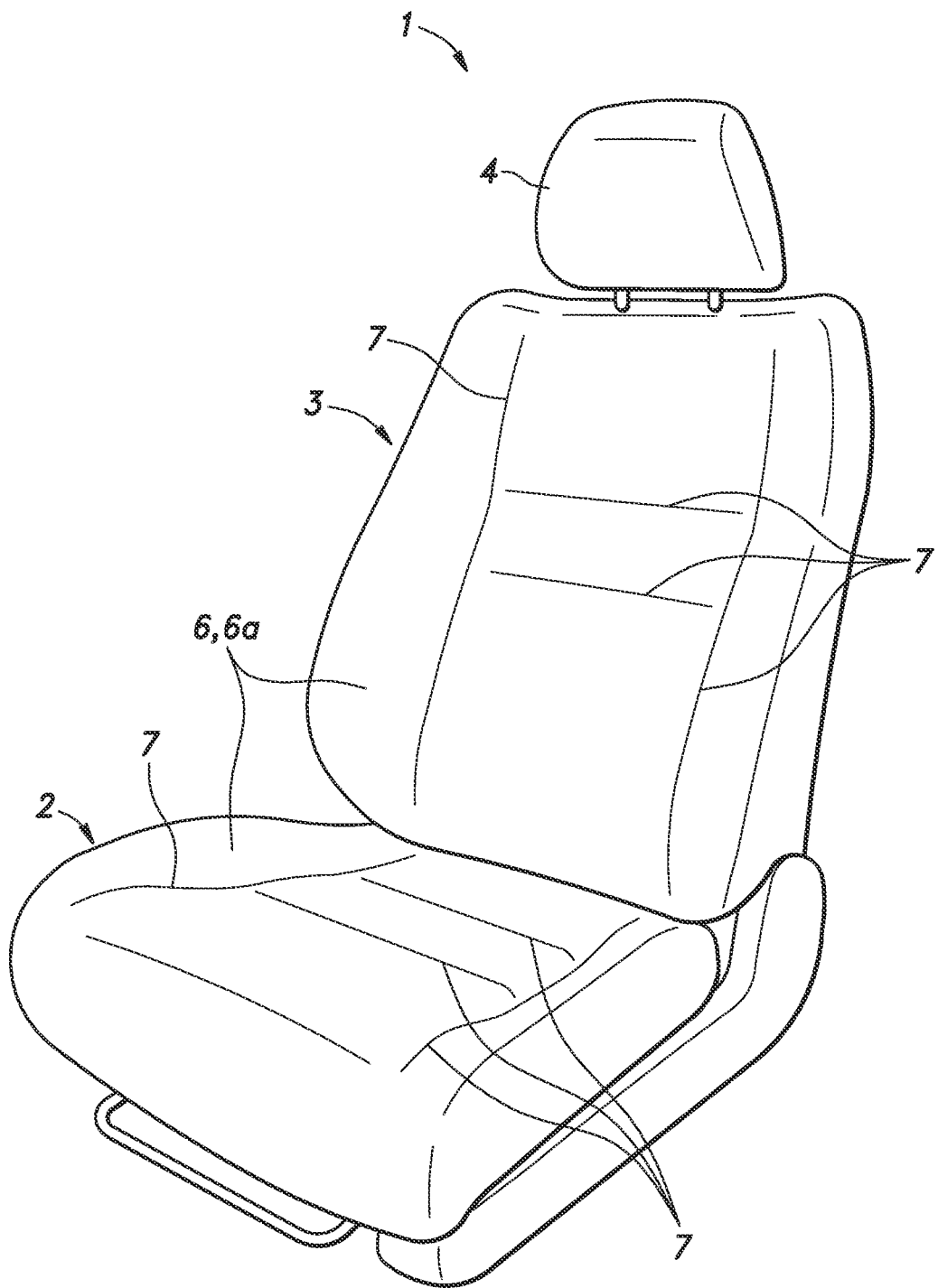
FIG. 1 is a perspective view of a vehicle seat to which a skin locking clip according to a first embodiment is applied.

FIG. 1 is a perspective view of a vehicle seat 1 according to the embodiment of the present invention. The vehicle seat 1 includes a seat cushion 2 supported by a vehicle body, a seat back 3 coupled to the seat cushion 2, and a headrest 4 coupled to the seat back 3. Each of the seat cushion 2, the seat back 3, and the headrest 4 includes a pad 5 (see FIG. 2) made of foaming resin such as urethane foam, and a skin material 6 covering a seating surface side of the pad 5. On surfaces of the seat cushion 2 and the seat back 3 on the seating surface side, a plurality of tuck-in portions 7, which are linearly recessed as the skin material 6 is tucked in the pad 5, are formed in the vertical direction and the horizontal direction.

Figure 2:
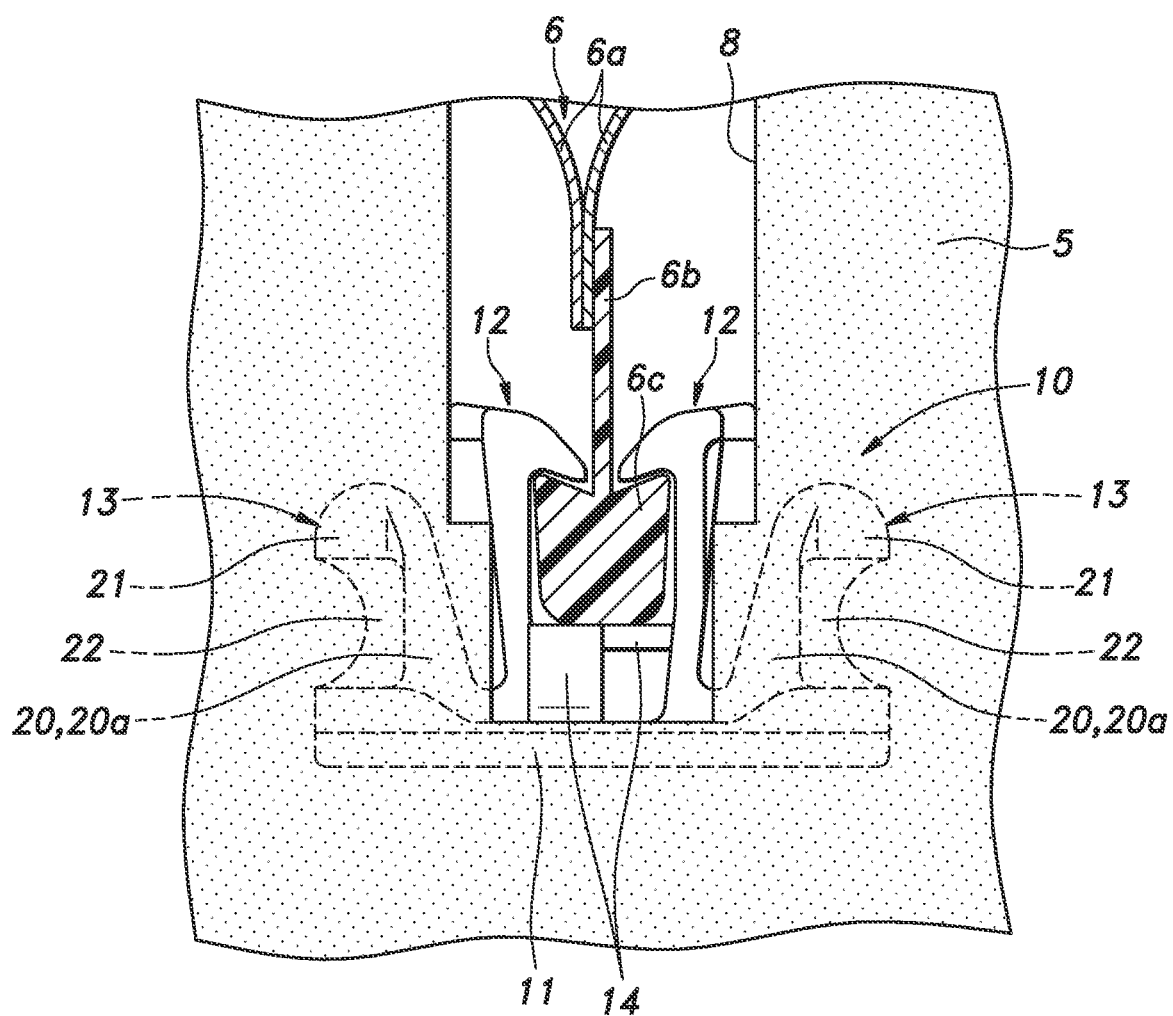
FIG. 2 is a front cross-sectional view showing a state where the skin locking clip according to the first embodiment is attached to a pad.
Figure 3:
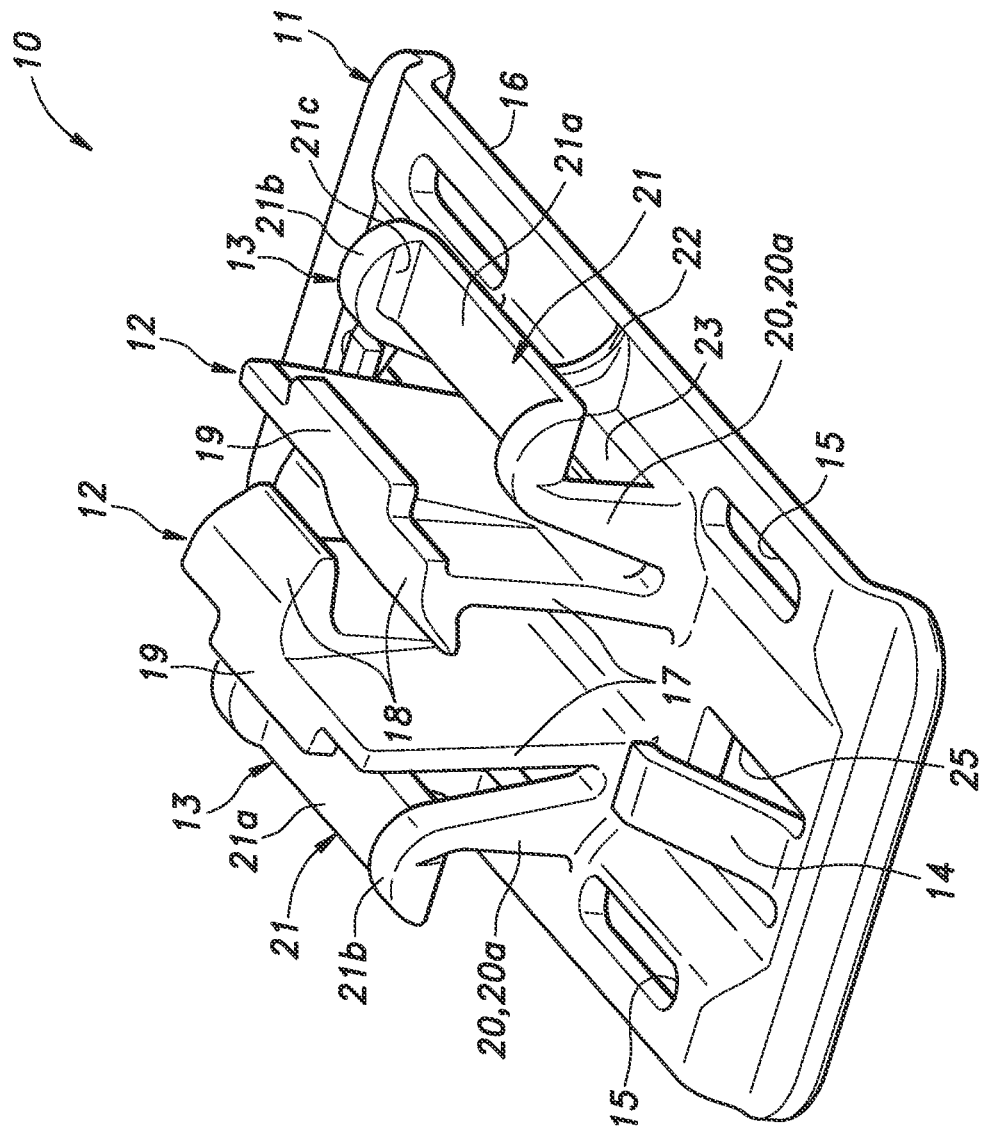
FIG. 3 is a perspective view of the skin locking clip according to the first embodiment.
Figure 4:
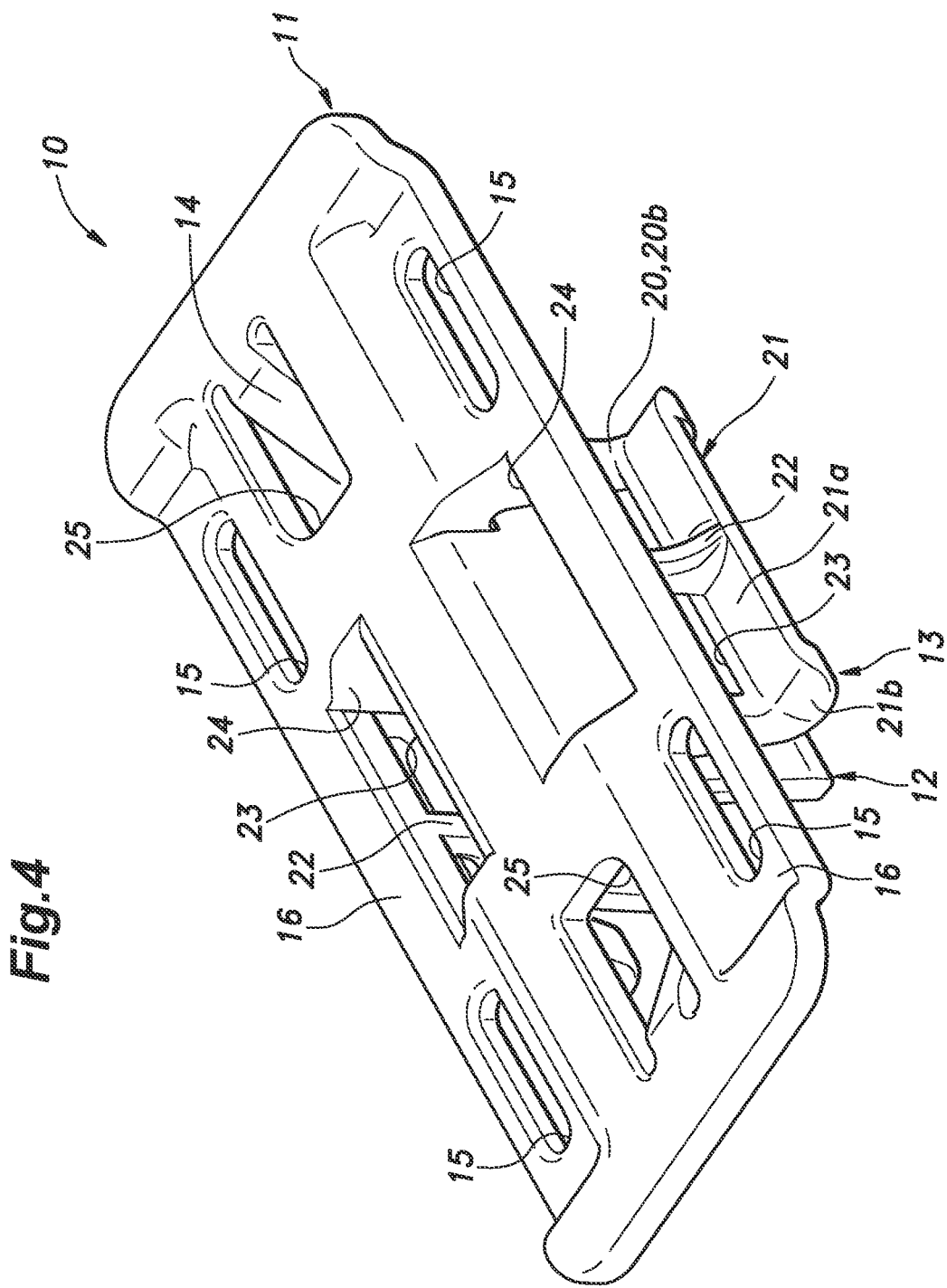
FIG. 4 is a perspective view of the skin locking clip according to the first embodiment.
Figure 5:
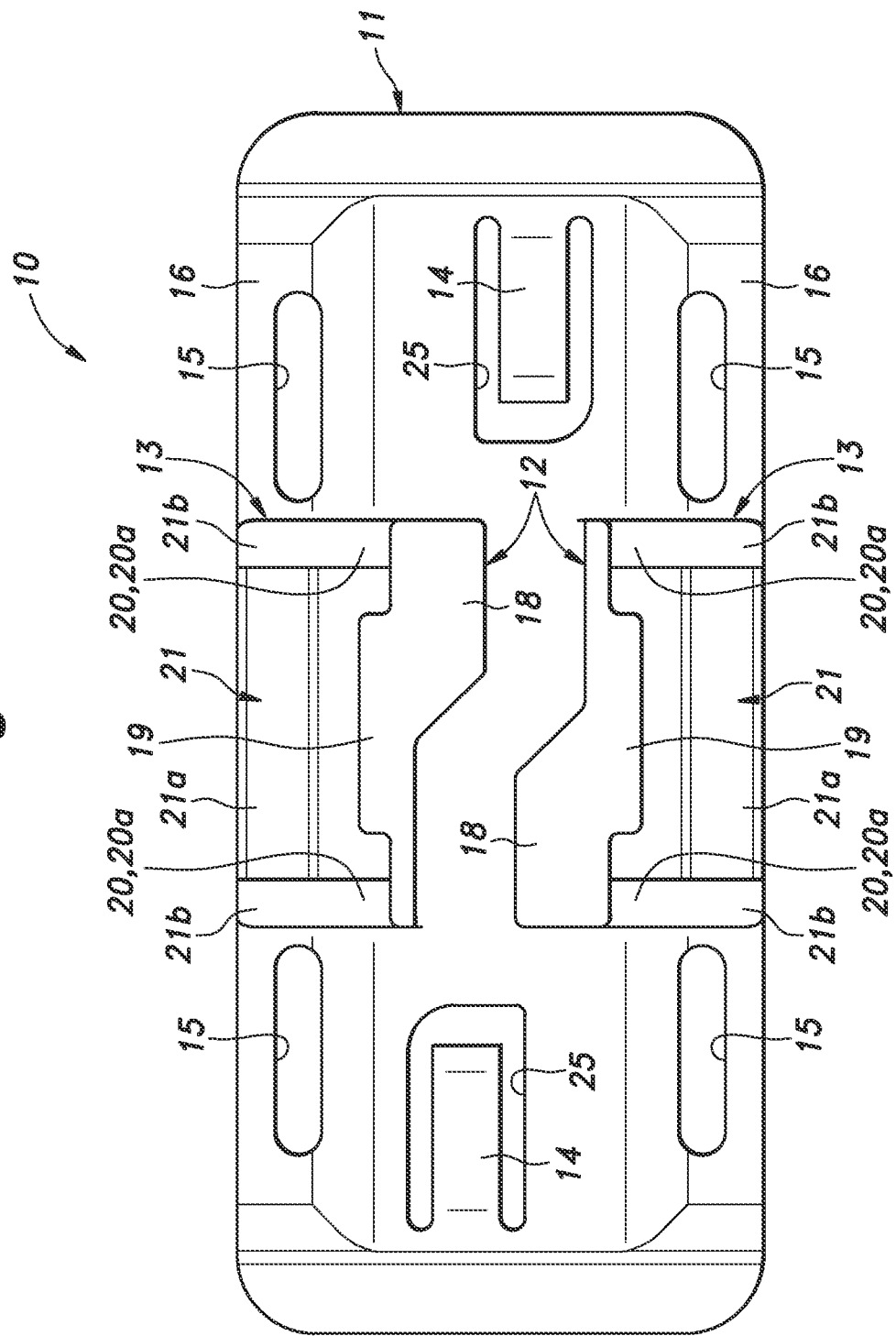
FIG. 5 is a plan view of the skin locking clip according to the first embodiment.
Figure 6:
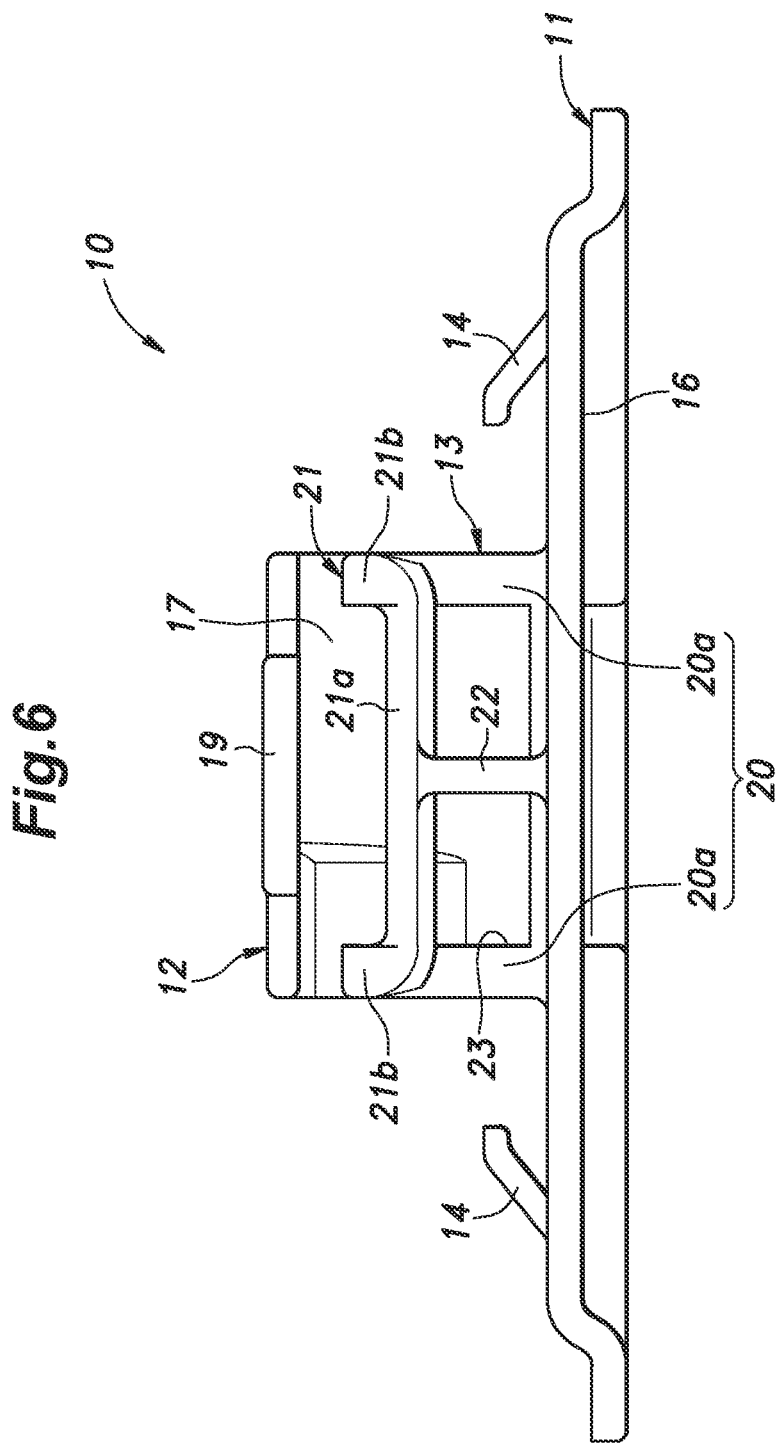
FIG. 6 is a side view of the skin locking clip according to the first embodiment.

FIG. 2 shows a state where a skin locking clip 10 (hereinafter referred to as "the clip 10") according to the embodiment is embedded in the pad 5. A groove 8 is provided at a portion of the pad 5 corresponding to each tuck-in portion 7. The groove 8 extends in a prescribed direction with a prescribed width and depth, and opens on an opposite side of the bottom thereof in the depth direction. In the following, unless otherwise noted, the direction of "upper" and "lower" does not refer to an upper side and a lower side of a vehicle, but refers to an opening side and a bottom side of the groove 8 in the depth direction. The skin material 6 (see FIG. 1) includes a main body portion 6a covering the pad 5, a cloth-like skin connecting portion 6b connected to the main body portion 6a at an upper end thereof and extending along the extending direction of the groove 8, and a locked portion 6c connected to a lower end of the skin connecting portion 6b and extending along the extending direction of the groove 8. The locked portion 6c is a rod-shaped or string-shaped member that bulges from the skin connecting portion 6b in the width direction of the groove 8, and is locked by the clip 10. The locked portion 6c has a substantially rectangular shape in a cross-section perpendicular to an extending direction thereof. An upper side of the locked portion 6c is recessed in a V shape, and a pair of side pieces of the locked portion 6c are slightly inclined so as to approach each other toward a lower side. In a cross-sectional view, the locked portion 6c is connected to the skin connecting portion 6b at the center of the V-shaped upper side of the locked portion 6c. The skin connecting portion 6b and the locked portion 6c are made of resin, and are integrally formed by extrusion molding.

FIGS. 3 to 6 show the clip 10. As shown in FIGS. 2 to 6, the clip 10 includes a base plate 11 embedded in the pad 5 at both ends in the width direction thereof, a pair of locking pieces 12 erected on an upper surface of the base plate 11 and configured to lock the locked portion 6c, a pair of overhanging pieces 13 erected on the upper surface of the base plate 11 outside the pair of locking pieces 12 in the width direction, and a pair of biasing portions 14 supported by the base plate 11 and configured to bias the locked portion 6c upward. The clip 10 has a symmetric shape (double symmetric shape), and the shape of the clip 10 before rotation coincides with the shape of the clip 10 after rotation when the clip 10 rotates 180° (360°/2) around an up-and-down axis passing through the center in the extending direction thereof and the center in the width direction thereof. Preferably, the clip 10 is an injection-molded product made of resin.

The base plate 11 is a plate-shaped portion, and the longitudinal direction and the width direction thereof coincide with the extending direction and the width direction of the groove 8, respectively. In the following, unless otherwise noted, "the prescribed direction" refers to the direction that coincides with the extending direction of the groove 8 and the longitudinal direction of the base plate 11, and "the width direction" refers to the direction that coincides with the width directions of the groove 8 and the base plate 11. At both ends of the base plate 11 in the width direction, a plurality of through holes 15 penetrating therethrough in the up-and-down direction are provided. Further, at each of both ends of the base plate 11 in the width direction, a stepped portion 16, which is recessed so as to be translated parallel to an upper side, is formed.

The pair of locking pieces 12 are configured so as to be arranged in the groove 8. Each of the pair of locking pieces 12 includes a wall body 17 erected on the base plate 11, a locking claw 18 extending from a tip portion of the wall body 17 toward an inside in the width direction so as to lock the locked portion 6c, and a guide portion 19 extending from the tip portion of the wall body 17 toward an outside in the width direction.

The wall body 17 is a plate-shaped portion arranged substantially perpendicularly to the width direction. The wall body 17 is arranged at the center in the prescribed direction, and the length of the wall body 17 in the prescribed direction is preferably about ¼ to ½, more preferably about ⅓ of the length of the base plate 11 in the prescribed direction.

The locking claw 18 inclines downward toward the inside in the width direction, and the thickness thereof in the up-and-down direction becomes thinner toward the inside in the width direction. Since each of the pair of locking pieces 12 is provided with the locking claw 18, a pair of locking claws 18 are provided in total. The pair of locking claws 18 are arranged at positions offset from each other in the prescribed direction. Each locking claw 18 preferably extends from the center of the wall body 17 in the prescribed direction toward one end of the wall body 17 in the prescribed direction. In a plan view, a side edge of each locking claw 18 on a center side in the prescribed direction is preferably notched so as to incline such that the shortest distance between the pair of locking claw 18 is extended, and the inclination angle thereof with respect to the width direction is preferably 45°. The distance in the width direction between the locking claw 18 of one of the pair of locking pieces 12 and the wall body 17 of the other of the pair of locking pieces 12 is smaller than the width of the locked portion 6c, but the pair of locking pieces 12 are elastically deformable such that the above distance becomes equal to or more than the width of the locked portion 6c. The shortest distance between the pair of locking claws 18, which are offset from each other in the prescribed direction, is similar to the above distance, or equal to or greater than the width of the locked portion 6c before elastic deformation thereof. The distance from each locking claw 18 to the base plate 11 in the up-and-down direction is greater than the height of the locked portion 6c in the up-and-down direction, and preferably at least 1.5 times the height thereof or more.

The guide portion 19 inclines upward toward an outside in the width direction. For each of the pair of locking pieces 12, at least a portion of the guide portion 19 matches at least a portion of the locking claw 18 in the width direction, and an upper surface of the guide portion 19 and an upper surface of the locking claw 18 are smoothly continuous with each other. The guide portion 19 is arranged in the center of the wall body 17 in the prescribed direction, and the length thereof is preferably equal to or more than ¼ of, and more preferably about ½ of the length of the wall body 17 in the prescribed direction. Alternatively, the length of the guide portion 19 may coincide with the length of the wall body 17.

The pair of overhanging pieces 13 are arranged so as to be embedded in the pad 5. The pair of overhanging pieces 13 are mirror images of each other and symmetrical with respect to a plane passing through the center of the clip 10 in the width direction and arranged perpendicularly to the width direction. Each of the pair of overhanging pieces 13 includes an erected portion 20 erected on the upper surface of the base plate 11, an overhanging portion 21 extending outward in the width direction from a tip side of the erected portion 20 and opposed to an upper surface of the end portion of the base plate 11 in the width direction, and a reinforcement rib 22 connecting an intermediate portion of the overhanging portion 21 in the prescribed direction and the end portion of the base plate 11 in the width direction.

The erected portion 20 includes a pair of pillars 20a extending from the base plate 11 at an interval in the prescribed direction of the overhanging portion 21 and connected to both ends of the overhanging portion 21 in the prescribed direction. The pair of pillars 20a substantially extend in the up-and-down direction. The pair of pillars 20a, the base plate 11, and the overhanging portion 21 define a first opening 23 penetrating therethrough in the width direction. In a portion of the base plate 11 between the pair of pillars 20a, a second opening 24 penetrating therethrough in the up-and-down direction is formed. The second opening 24 communicates with the first opening 23.

In each of the pair of overhanging pieces 13, the overhanging portion 21 includes a flat plate portion 21a having a lower surface opposed to and parallel with the upper surface of the end portion of the base plate 11 in the width direction, and a pair of protruding pieces 21b extending upward from both ends of the flat plate portion 21a in the prescribed direction. An outer end of the flat plate portion 21a in the width direction overhangs so as to reach a position that vertically matches an outer end of the base plate 11 in the width direction. In a front view, an upper edge of each protruding piece 21b has an arc shape, and is smoothly connected to an inside edge of each pillar 20a in the width direction. Recesses 21c are provided on inner surfaces of the pair of protruding pieces 21b opposed to each other.

Preferably, the reinforcement rib 22 extends substantially in the up-and-down direction, and is connected to the center of the overhanging portion 21 in the prescribed direction. Since the second opening 24 is provided, the reinforcement rib 22 is offset from the pillar 20a toward an outside in the width direction. An upper end of the reinforcement rib 22 extends from an inner end to an outer end of the flat plate portion 21a in the width direction, and a lower end of the reinforcement rib 22 extends from an edge defining the first opening 23 at the end portion of the base plate 11 in the width direction to an outer end of the base plate 11 in the width direction. In a front view, an outer side edge of the reinforcement rib 22 in the width direction is recessed in an arc shape, and an inner side edge of the reinforcement rib 22 in the width direction is formed like a straight line along the up-and-down direction.

Each of the pair of biasing portions 14 consists of a leaf spring supported by the base plate 11 in a cantilevered manner. The pair of biasing portions 14 are arranged inside the pair of locking pieces 12 in the width direction so as to bias the locked portion 6c upward. The pair of biasing portions 14 are arranged outside the pair of locking pieces 12 in the prescribed direction, but may be modified so as to be arranged inside the pair of locking pieces 12 in the prescribed direction. The pair of biasing portions 14 are preferably arranged at positions offset from each other in the width direction. Preferably, in portions of the base plate 11 arranged below the pair of biasing portions 14, third openings 25 penetrating therethrough in the up-and-down direction are formed so as to accommodate the biasing portions 14 during elastic deformation thereof. A distance in the up-and-down direction from the biasing portions 14 in a state of not being elastically deformed to the locking claws 18 is smaller than a height of the locked portion 6c in the up-and-down direction so that the pair of biasing portions 14 and the locking claws 18 can hold the locked portion 6c therebetween in the up-and-down direction. Further, the biasing portions 14 are elastically deformable such that the distance in the up-and-down direction from the biasing portions 14 to the locking claws 18 becomes greater than the height of the locked portion 6c in the up-and-down direction. Incidentally, each biasing portion 14 may be supported not by the base plate 11 but by the wall body 17, and may consist of a spring other than a leaf spring, for example, a compression coil spring.

The first opening 23 and the second opening 24 are provided, the lower surface of the overhanging portion 21 and the upper surface of the end portion of the base plate 11 in the width direction are parallel to each other, and the pair of biasing portions 14 are arranged at positions offset from each other in the width direction. Accordingly, the direction in which a mold for forming the clip 10 is removed can be secured, and the complexity of the mold can be suppressed. The shape that generates a step in the stepped portion 16 enhances the rigidity of the clip 10. Since the locked portion 6c has a relatively simple shape, the locked portion 6c can be extruded at low cost.

An attachment state of the clip 10 to the pad 5 will be described. The clip 10 is arranged at a prescribed position during molding of the pad 5 so as to be fixed to the pad 5. The pad 5 enters a space between the end portion of the base plate 11 in the width direction and the overhanging portion 21 of each overhanging piece 13, and thus the clip 10 is firmly supported by the pad 5. The reinforcement rib 22, which connects the overhanging portion 21 and the end portion of the base plate 11 in the width direction, reinforces the overhanging portion 21. Also, the reinforcement rib 22 is embedded in the pad 5, thereby stabilizing the position of the clip 10 with respect to the pad 5 and causing the pad 5 to firmly support the clip 10. Further, the pad 5 enters the through holes 15, the stepped portion 16, the recesses 21c, the first opening 23, and the second opening 24, thereby stabilizing the position of the clip 10 with respect to the pad 5 and causing the pad 5 to firmly support the clip 10.

Figure 7:
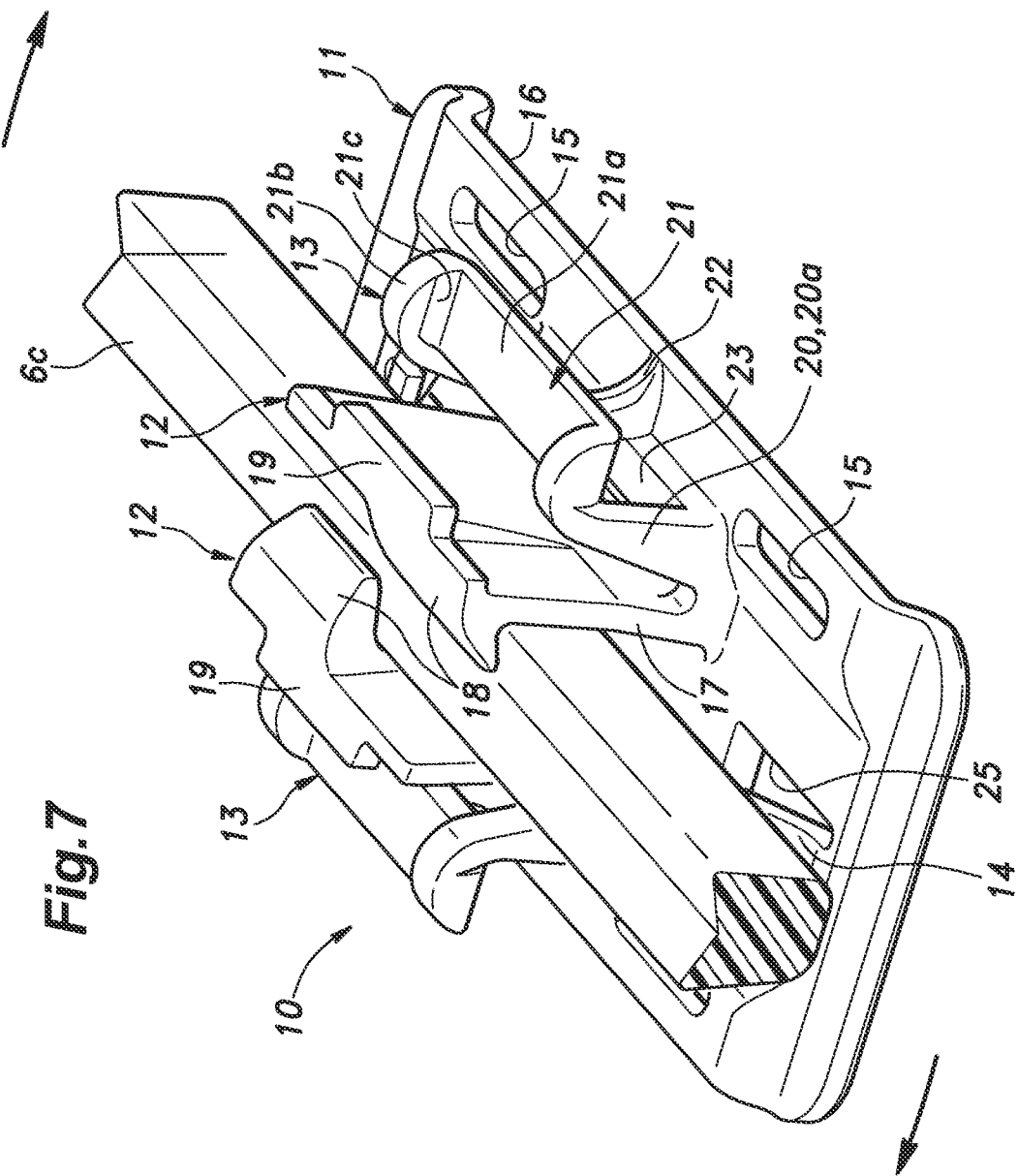
FIG. 7 is a perspective view showing a state where the skin locking clip according to the first embodiment locks a locked portion.

FIGS. 7 and 8 show the clip 10 and the locked portion 6c (the skin connecting portion 6b is not shown). An attachment/detachment of the locked portion 6c to/from the clip 10 will be described with reference to FIGS. 7 and 8.

The worker presses the locked portion 6c against upper surfaces of the pair of locking pieces 12 so as to attach the locked portion 6c to the clip 10. At this time, even if the locked portion 6c is pressed against the upper surfaces of the pair of locking pieces 12 in a state of being offset in the width direction, the guide portion 19 inclined downward toward an inside in the width direction guides the locked portion 6c toward the center in the width direction, namely, toward a space between the pair of locking pieces 12. The locked portion 6c slides on the inclined upper surfaces of the locking pieces 12, and thus the upper portions of the pair of locking pieces 12 are elastically deformed so as to be separated from each other in the width direction. When the distance in the width direction between the locking claw 18 of one of the locking pieces 12 and the wall body 17 of the other of the locking pieces 12 becomes equal to or greater than the width of the locked portion 6c, the locked portion 6c can move below the locking claws 18. When the locked portion 6c passes through the locking claws 18, the pair of locking pieces 12 returns to positions before the elastic deformation thereof.

Figure 8A:
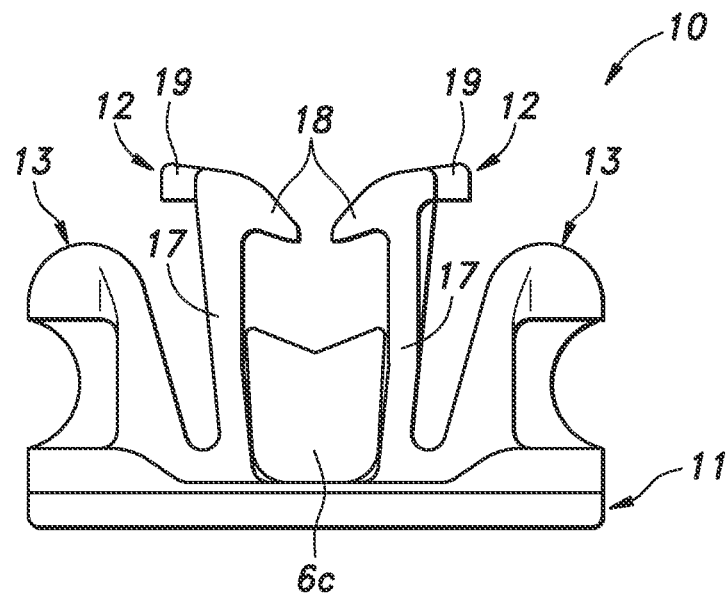
FIGS. 8A and 8B are front views each showing the skin locking clip and the locked portion according to the first embodiment (the locked portion is pushed in FIG. 8A, and the locked portion is locked in FIG. 8B)

By elastically deforming the pair of biasing portions 14, the worker can press the locked portion 6c below the locking claws 18 by a prescribed length (FIG. 8A). Accordingly, the worker can easily move the locked portion 6c below the locking claws 18 by pressing the locked portion 6c downward in this way, thereby easily attaching the locked portion 6c to the locking claws 18.

Figure 8B:
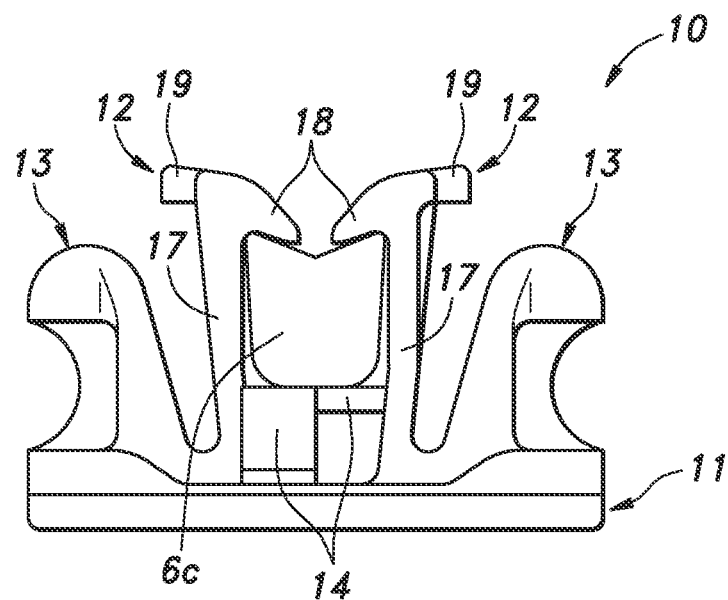

When the worker releases his/her hand from the locked portion 6c, the locked portion 6c, which is biased upward by the pair of biasing portions 14, is pressed against the pair of locking claws 18 (FIG. 8B). The locked portion 6c is supported by the clip 10 at four points, namely, by the pair of biasing portions 14 and the pair of locking claws 18. Accordingly, the movement of the locked portion 6c in the up-and-down direction is restricted, and the rotation of the locked portion 6c around an axis in the prescribed direction is prevented. In this way, the locked portion 6c is locked by the clip 10 without play, and thus unlikely to disengage from the clip 10.

When detaching the locked portion 6c from the clip 10, as shown by arrows in FIG. 7, the worker rotates the locked portion 6c around an up-and-down axis passing near the center of the locking pieces 12 in the prescribed direction so as to elastically deform the pair of locking pieces 12 such that the distance between the upper portions thereof is widened. When the distance between the locking claw 18 of one of the locking pieces 12 and the wall body 17 of the other of the locking pieces 12 becomes equal to or greater than the width of the locked portion 6c, the locked portion 6c can be detached from the clip 10. The pair of locking claws 18 are offset from each other in the prescribed direction, so that a gap for the detachment of the locked portion 6c can be relatively easily generated between the upper portions of the pair of locking pieces 12. Further, since the end portion of each of the pair of locking claws 18 on the center side in the prescribed direction is inclined in a plan view, the shortest distance between the pair of locking claws 18 increases, so that the locked portion 6c can be easily detached.

Figure 10:
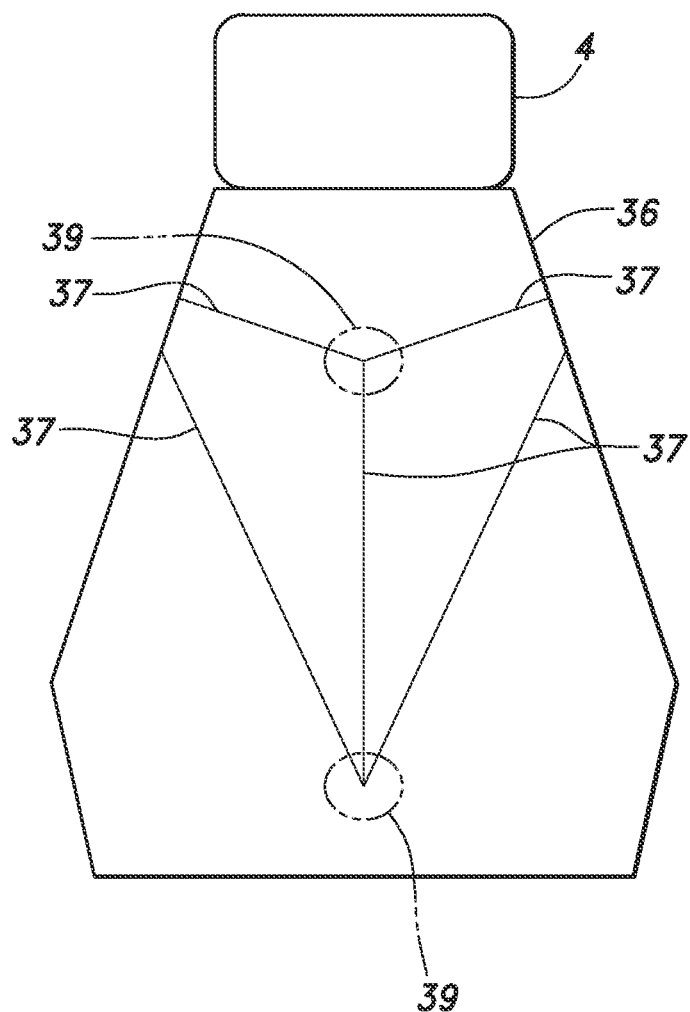
FIG. 10 is a front view schematically showing a seat back of the vehicle seat according to the second embodiment.

FIGS. 9 and 10 show a vehicle seat 31 according to a second embodiment. The vehicle seat 31 includes a pad 32, a skin material 33 covering a surface side of the pad 32 in the thickness direction thereof, and a plurality of skin locking clips 35 (hereinafter referred to as "the clips 35") embedded in the pad 32 and configured to tuck in a prescribed linear portion 34 of the skin material 33. In a seat back 36 of the vehicle seat 31, a plurality of tuck-in portions 37 are formed on a surface on a seating surface side (surface side). The plurality of tuck-in portions 37 are recessed linearly since the skin material 33 is tucked in the pad 32. In the present embodiment, the pad 32, the skin material 33, and the clips 35 applied to the seat back 36 of the vehicle seat 31 will be described as examples, but the same configurations may be applied to the seat cushion 2 (see FIG. 1).

The pad 32 is made of foaming resin such as urethane foam, and has a groove 38 opening on the surface side at a position corresponding to each tuck-in portion 37. Each clip 35 is partially embedded in the bottom of the groove 38 and its vicinity. The skin material 33 includes a main body portion 33a covering the pad 32 and a linear portion 34 connected to the main body portion 33a and extending in an extending direction of the groove 38. The linear portion 34 includes a skin connecting portion 33b corresponding to the skin connecting portion 6b (see FIG. 2) of the first embodiment and a locked portion 33c corresponding to the locked portion 6c (see FIG. 2) of the first embodiment. The skin connecting portion 33b and the locked portion 33c are made of resin, integrally formed by extrusion molding, and harder than the pad 32. The locked portion 33c is locked by each clip 35, and thus the linear portion 34 is tucked in the groove 38.

The plurality of clips 35 are arranged in the groove 38 extending linearly so as to be separated from each other. Preferably, each clip 35 is arranged at a crossing portion 39 where the tuck-in portions 37 extending linearly cross each other. The clip 35 includes a base plate 40, a pair of locking pieces 12 extending toward a surface side from the base plate 40 and opposed to each other in the width direction of the groove 38, and a pair of overhanging pieces 41 extending toward the surface side from both ends of the base plate 40 in the width direction. Locking pieces 12 have the same structure as the locking pieces 12 (see FIG. 3) of the clip 10 according to the first embodiment. Namely, each of the pair of locking pieces 12 includes a wall body 17 erected on the base plate 40, a locking claw 18 extending from a tip portion of the wall body 17 toward an inside in the width direction so as to lock the locked portion 33c, and a guide portion 19 extending from the tip portion of the wall body 17 toward an outside in the width direction. Each of the pair of overhanging pieces 41 is shorter than the locking pieces 12, and the tip portion thereof extends closer to the outside in the width direction than both ends of the base plate 40 in the width direction.

The base plate 40 and each overhanging piece 41 of each clip 35 are embedded in the pad 32. The pad 32 is not filled in a space between tip portions of the pair of locking pieces 12 so that the locked portion 33c can be received therein. Each of side surfaces of the groove 38 near the bottom thereof has an inclined surface 42 directed to an inside in the width direction toward the bottom so as to be connected to a surface of the locking claw 18 or the guide portion 19 on a side of the main body portion 33a. Preferably, the inclined surface 42 does not cover the entirety of the surface of the locking claw 18 or the guide portion 19 on the side of the main body portion 33a, but is connected to an intermediate portion of the surface thereof so that an inner portion of the surface thereof in the width direction is exposed. More preferably, the exposed surface bulges toward the main body portion 33a with respect to the extension surface of the inclined surface 42. Further, so as to enhance the visibility of the exposed surface, the color of each clip 35 is preferably different from that of the pad 32. For example, in a case where the pad 32 is white or pale yellow, the clip 35 is preferably blue.

The function and effect of the vehicle seat 31 according to the second embodiment will be explained. The inclined surface 42 of the groove 38 is connected to the surfaces of the locking claw 18 and the guide portion 19 of each locking piece 12 on a side of the skin material 33. Accordingly, the locked portion 33c is guided so as to enter a space between the pair of locking pieces 12 at the time of attachment, and is prevented from accidentally entering a space outside the pair of locking pieces 12 in the width direction. Portions of the surfaces of the locking claw 18 and the guide portion 19 on the side of the skin material 33 are exposed from the pad 32. Accordingly, the worker can easily find each clip 35 when assembling the locked portion 33c to the clip 35. Further, the exposed portions of the surfaces thereof bulge toward a side of the main body portion 33a, and the color of the clip 35 is different from that of the pad 32, so that the visibility of the clip 35 can be further improved. The clip 35 is arranged at the crossing portion 39 of the tuck-in portions 37 extending linearly, and thus it is possible to prevent the design of the skin material 33 at the crossing portion 39 from being offset, and to prevent the reproducibility of the surface design of the vehicle seat 31 from being deteriorated.

Figure 11:
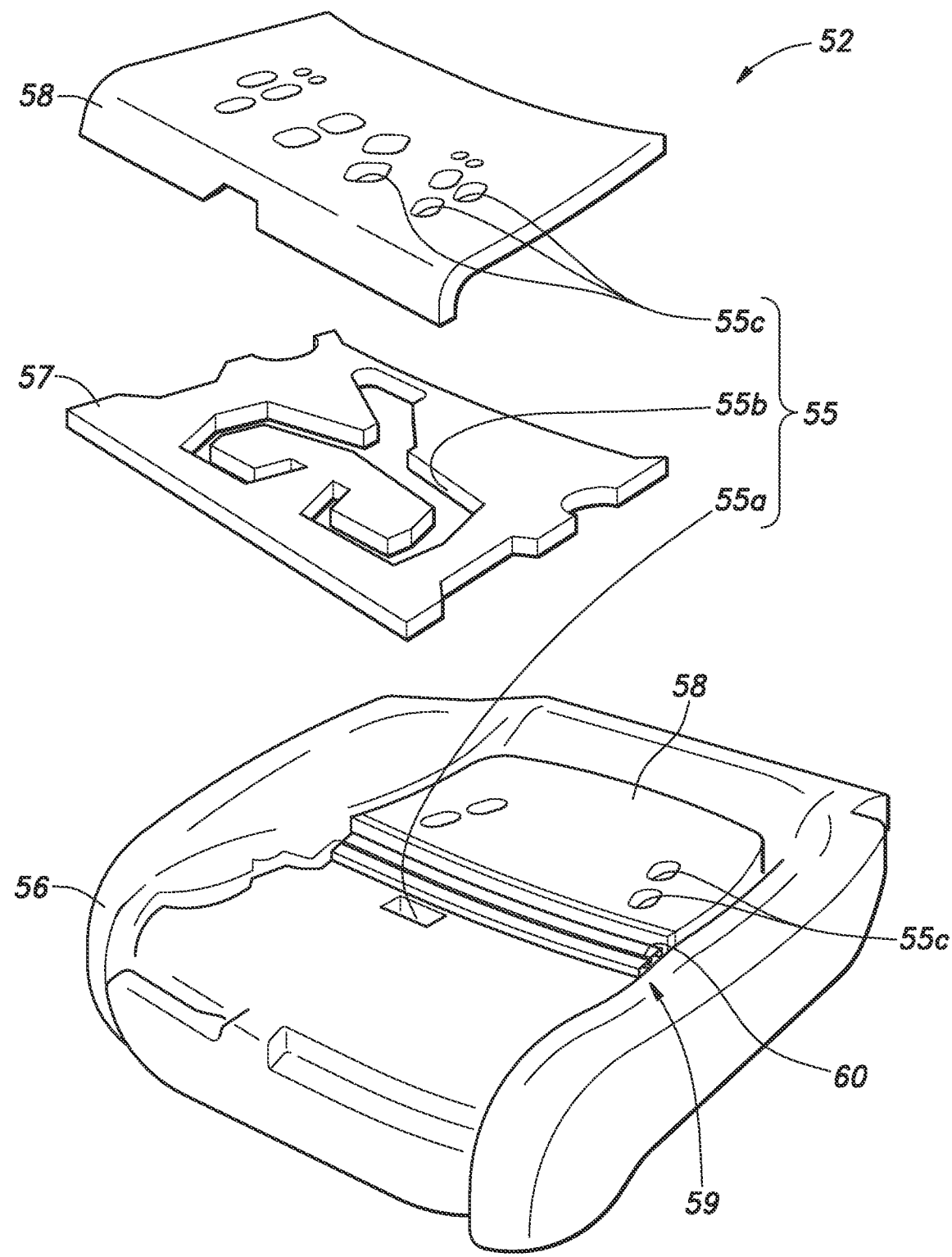
FIG. 11 is an exploded perspective view showing a pad according to a third embodiment.
Figure 12:
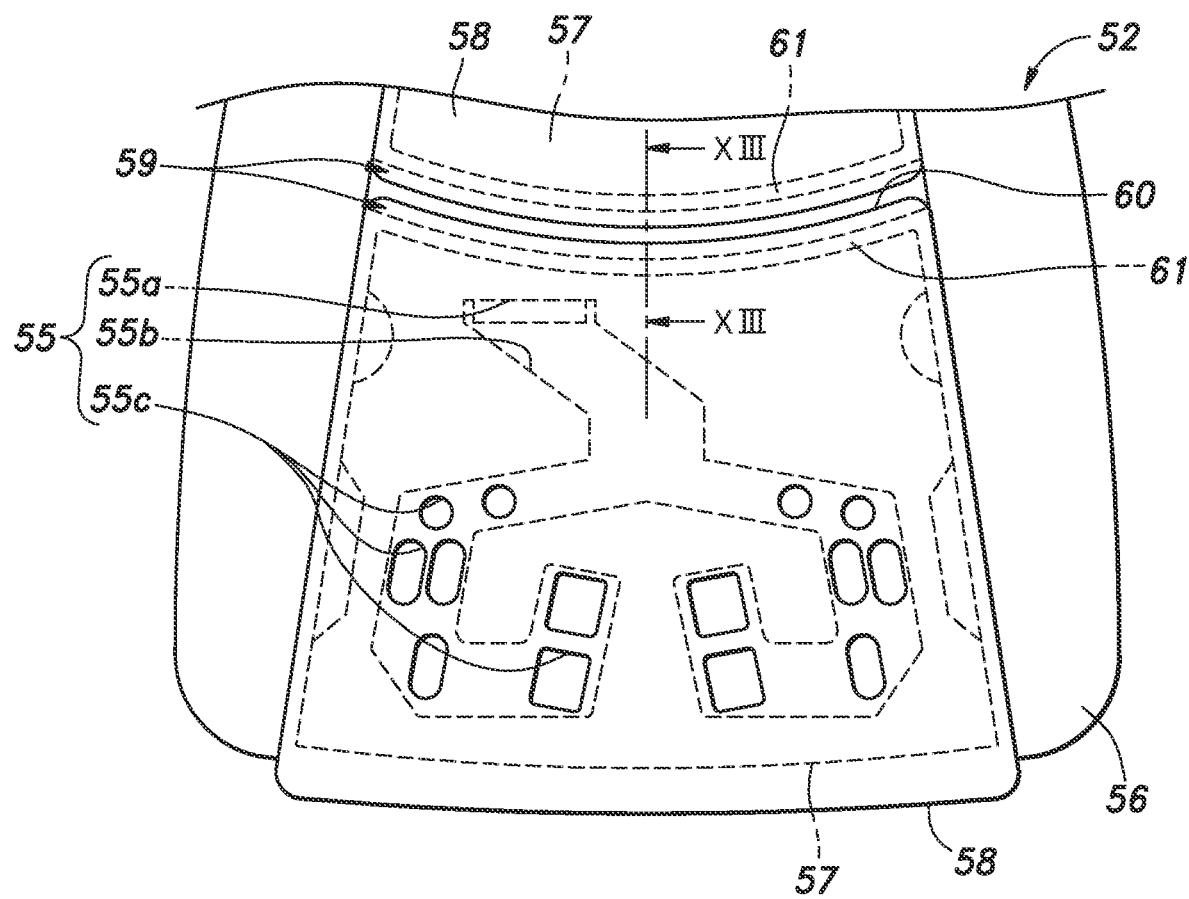
FIG. 12 is a plan view showing the pad according to the third embodiment.
Figure 13:
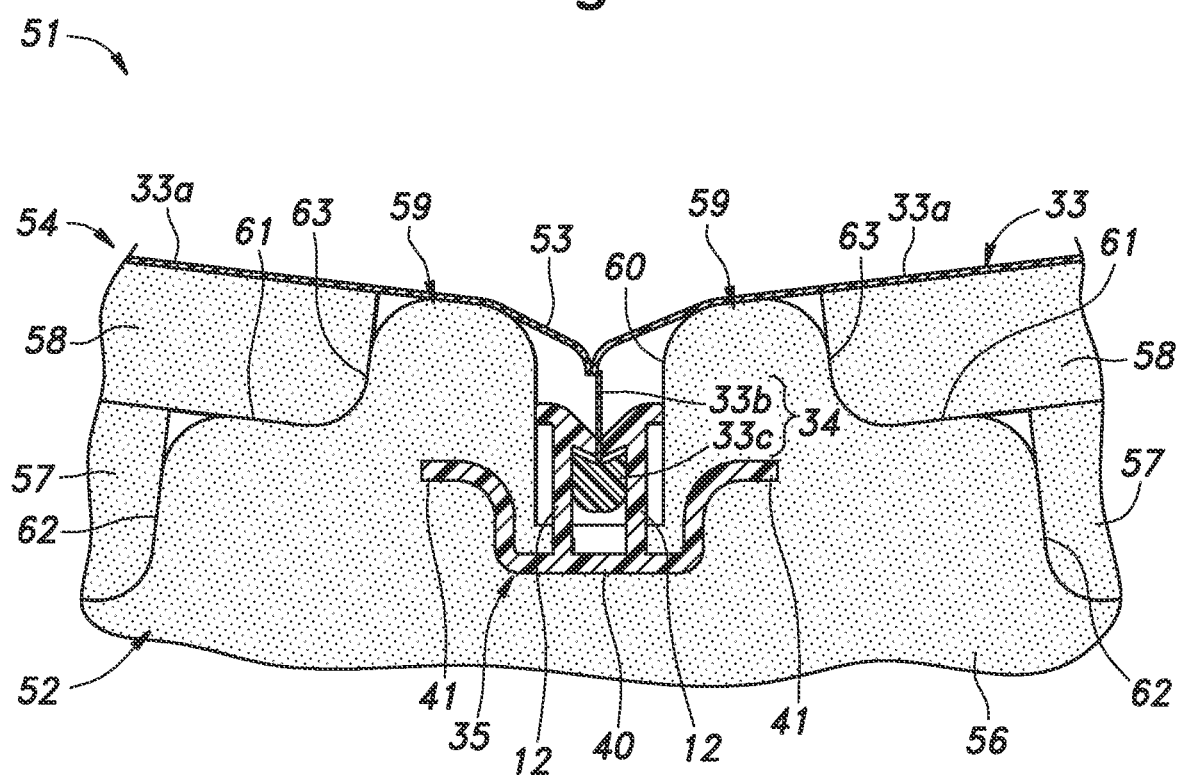
FIG. 13 is a cross-sectional view showing a tuck-in portion of a vehicle seat according to the third embodiment (in a cross-section along a line XIII-XIII in FIG. 12)

FIGS. 11 and 12 show a pad 52 according to a third embodiment. FIG. 13 shows a tuck-in portion 53 of a vehicle seat 51 according to the third embodiment. The common configurations in the second and third embodiments will be provided with common reference numerals, and the descriptions thereof will be omitted. The vehicle seat 51 according to the third embodiment includes a pad 52, a skin material 33 covering a surface side of the pad 52 in the thickness direction thereof, a clip 35 embedded in the pad 52 and configured to tuck in a prescribed linear portion 34 of the skin material 33. In the present embodiment, the pad 52, the skin material 33, and the clip 35 applied to a seat cushion 54 of the vehicle seat 51 will be described as examples, but the same configurations may be applied to the seat back 3 (see FIG. 1).

The vehicle seat 51 is provided with an air ventilation system (AVS). Namely, an air passage 55 is provided in the pad 52, and a blower (not shown) provided at a lower portion of the vehicle seat 51 sends/sucks air to/from a surface of the vehicle seat 51 via the air passage 55.

The pad 52 includes a main body member 56 in which the clip 35 is embedded, an intermediate layer member 57 arranged on the main body member 56, and a surface layer member 58 arranged on the intermediate layer member 57. The air passage 55 includes a first section 55a extending in the main body member 56 in the up-and-down direction and opening on an upper surface of the main body member 56, a second section 55b extending along the upper surface of the main body member 56 so as to communicate with the first section 55a, and a third section 55c communicating with the second section 55b and composed of a plurality of openings penetrating the surface layer member 58 in the up-and-down direction. A bottom surface of the second section 55b is defined by a top surface of the main body member 56, a side surface of the second section 55b is defined by the intermediate layer member 57, and an upper surface of the second section 55b is defined by the surface layer member 58. The intermediate layer member 57 and the surface layer member 58 are members formed separately from the main body member 56 so as to form the second section 55b and the third section 55c of the air passage 55, and are thinner than the main body member 56. The main body member 56, the intermediate layer member 57, and the surface layer member 58 are made of foaming resin such as urethane foam. The clip 35 is embedded in the main body member 56 at the time of foaming of the main body member 56.

The main body member 56 includes a pair of linear bulging portions 59 extending along the linear portion 34 of the skin material 33. Each linear bulging portion 59 bulges closer to a surface side (upper side) than a portion of the main body member 56 on which the intermediate layer member 57 is arranged. The main body member 56 has a groove 60 between the pair of linear bulging portions 59. The clip 35 is embedded near a bottom of the groove 60, the locking pieces 12 protrude from the bottom of the groove 60, and the base plate 40 and the overhanging pieces 41 are embedded in the pad. A bulging end face of each linear bulging portion 59 defines a plane substantially identical to a surface of the surface layer member 58. The skin material 33 is tucked in by the clip 35 at a portion extending further from the surface layer member 58 than one of the linear bulging portions 59, and the locked portion 33c is locked by the clip 35.

Each linear bulging portion 59 includes a linear shelf surface 61 on the opposite side of the groove 60. The linear shelf surface 61 faces toward the surface side (upward), and extends along an extending direction of the linear bulging portion 59. Since the linear shelf surface 61 is provided, a first side surface 62 and a second side surface 63 are defined in the linear bulging portion 59. The first side surface 62 is arranged on a base side of the linear shelf surface 61, and extends along the extending direction of the linear bulging portion 59. The second side surface 63 is arranged on a tip side of the linear shelf surface 61, and extends along the extending direction of the linear bulging portion 59. The length of the first side surface 62 in the thickness direction is substantially equal to the thickness of the intermediate layer member 57, and the length of the second side surface 63 in the thickness direction is substantially equal to the thickness of the surface layer member 58. The intermediate layer member 57 is arranged such that an edge thereof is substantially in contact with (in contact with or close to) the first side surface 62. The surface layer member 58 is arranged such that an end portion thereof is arranged on the linear shelf surface 61 and an edge thereof is substantially in contact with the second side surface 63.

A portion (a base portion of each locking piece 12, the base plate 40, and each overhanging piece 41) of the clip 35 embedded in the main body member 56 is preferably arranged closer to the linear portion 34 than an extension surface of the second side surface 63. Further, an extending end of the locking piece 12 is not embedded in the pad 52, and is preferably arranged closer to the surface side in the thickness direction than a bottom surface (a surface arranged on the linear shelf surface 61) of the surface layer member 58. The overhanging piece 41 is preferably arranged closer to a back side (lower side) than the linear shelf surface 61. The clip 35 is preferably arranged so as to avoid a portion close to the air passage 55.

The function and effect of the vehicle seat 51 according to the third embodiment will be explained. By using the intermediate layer member 57 and the surface layer member 58, the shape of the air passage 55 can be designed more freely. A portion of the main body member 56 where the clip 35 is embedded includes the linear bulging portions 59, and thus is thicker than the intermediate layer member 57 and the surface layer member 58. Accordingly, compared with a case where the clip 35 is embedded in the intermediate layer member 57 or the surface layer member 58, the pad 52 can support the clip 35 more firmly, so that the clip 35 can be prevented from disengaging from the pad 52 by the load from the locked portion 33c. By providing the linear shelf surface 61, the first side surface 62, and the second side surface 63, the worker can easily attach the intermediate layer member 57 and the surface layer member 58 to the main body member 56. The clip 35 is arranged closer to the linear portion 34 than the extension surface of the second side surface 63, and the end portion of the clip 35 in the width direction is embedded in a relatively thick portion of each linear bulging portion 59, so that the force for supporting the clip 35 by the main body member 56 can be increased. The extending end of each locking piece 12 is not embedded in the pad 52, and is arranged closer to the surface side in the thickness direction than the bottom surface of the surface layer member 58, so that the linear bulging portion 59 can be prevented from becoming excessively thick.

Figure 14:
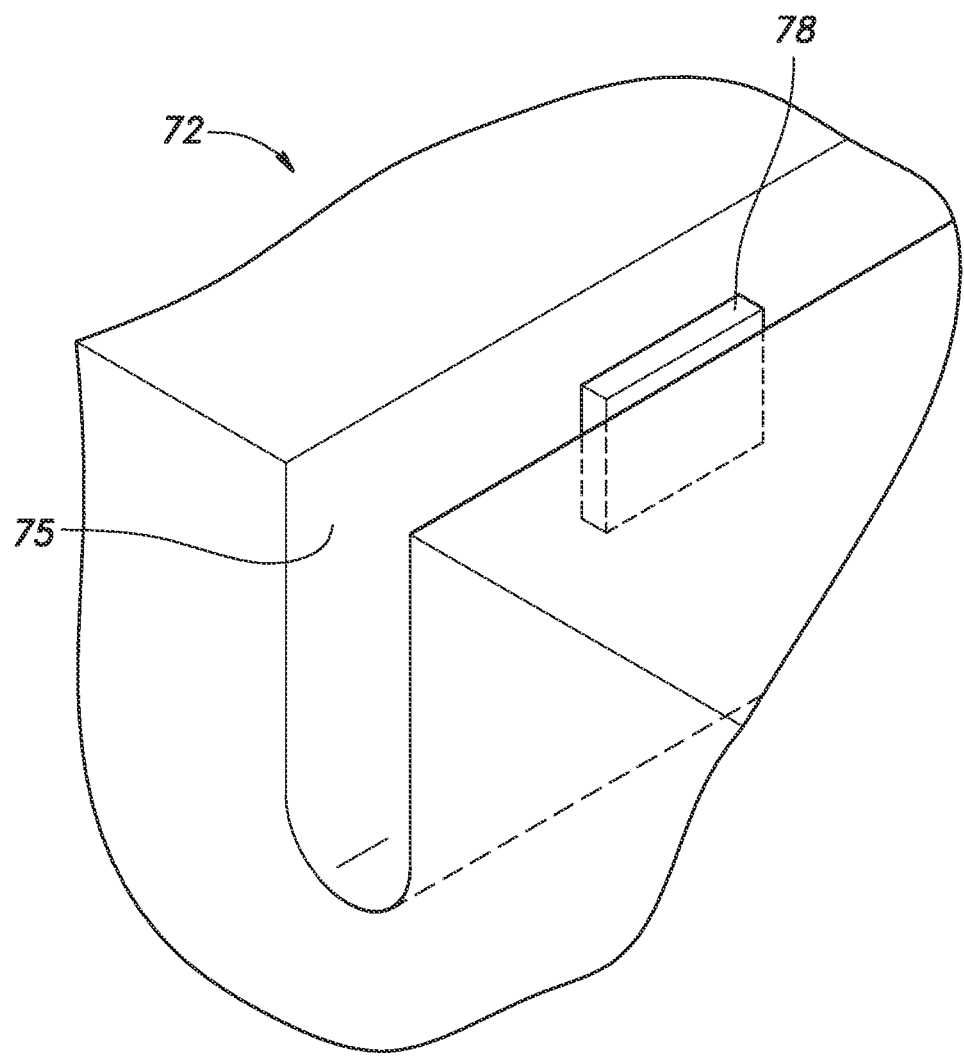
FIG. 14 is a perspective view showing a portion of a pad according to a fourth embodiment.
Figure 15:
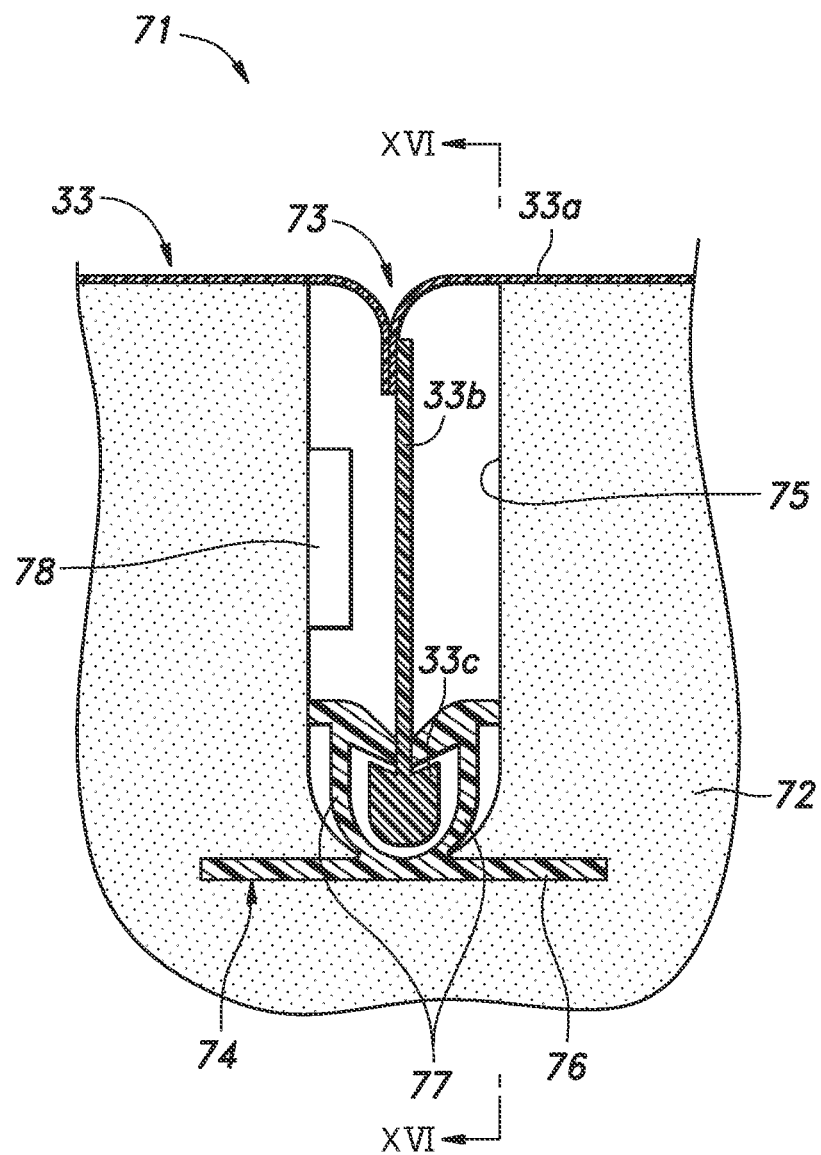
FIG. 15 is a cross-sectional view showing a tuck-in portion of a vehicle seat (in a cross-section perpendicular to an extending direction of a groove) according to the fourth embodiment.

FIG. 14 shows a pad 72 according to a fourth embodiment, and FIGS. 15 and 16 show a tuck-in portion 73 of a vehicle seat 71 according to the fourth embodiment. The common configurations in the above embodiments and the fourth embodiment will be provided with common reference numerals, and the descriptions thereof will be omitted. The vehicle seat 71 according to the fourth embodiment includes a pad 72, a skin material 33 covering a surface side of the pad 72 in the thickness direction thereof, skin locking clips 74 (hereinafter referred to as "the clips 74") embedded in the pad 72 and configured to tuck in a prescribed linear portion 34 of the skin material 33.

The pad 72 is made of foaming resin such as urethane foam, and has a groove 75 opening on the surface side at a position corresponding to the tuck-in portion 73. The linear portion 34 of the skin material 33 is harder than the pad 72. Each clip 74 includes a base plate 76 embedded in the pad 72, a pair of locking pieces 77 extending from the base plate 76 toward the surface side of the pad 72 in the thickness direction thereof and protruding from a bottom of the groove 75 toward an inside thereof. The locked portion 33c of the skin material 33 is locked by the pair of locking pieces 77 so as to form the tuck-in portion 73. Incidentally, as shown in FIG. 17, the pad 72 may include pad protrusions 82 whose protruding surfaces are in contact with a back surface of the main body portion 33a of the skin material 33 and thick portions 83 provided at the bottom of the groove 75 between the pad protrusions 82, and the clips 74 may be embedded in the thick portions 83. In this case, each thick portion 83 is preferably connected to at least one of the pad protrusions 82. Although the weight of the pad 72 is increased by providing the thick portions 83, the clips 74 are held by the thick portions 83 for reinforcing the pad protrusions 82, so that the force for holding the clips 74 by the pad 72 can be improved. Namely, the force with which the clips 74 stay in the pad 72 against a pulling load for pulling the linear portion 34 upward can increase.

As shown in FIGS. 14 to 17, the pad 72 includes protrusions 78 protruding from side surfaces of the groove 75 toward the width direction of the groove 75. Each protrusion 78 has a substantially rectangular shape when viewed in the extending direction of the groove 75. Each protrusion 78 is preferably provided at an intermediate position of the groove 75 in the depth direction thereof, and more preferably provided within a range in which the skin connecting portion 33b is arranged in the depth direction thereof. The protrusions 78 are provided near both ends of the linear portion 34 of the skin material 33 in the extending direction thereof. The protruding length of each protrusion 78 may be lengthened so that the protrusion 78 can lock the linear portion 34 from an outside in the extending direction thereof. The protrusion 78 may be molded integrally with a main body of the pad 72, or may consist of a member separate from the main body of the pad 72. In a case where the protrusion 78 is separate from the main body of the pad 72, the protrusion 78 may be attached to the main body of the pad 72 with an adhesive or the like, or attached to the main body of the pad 72 by being inserted thereinto when the main body of the pad 72 is molded. Further, the protrusion 78 is preferably harder than the main body of the pad 72.

Each protrusion 78 functions as a mark for attaching the linear portion 34 to each clip 74. The protrusions 78 protrude from the side surfaces of the groove 75, and thus can be easily found as compared with a case where the protrusions 78 protrude from a bottom of the groove 75. In a case where each protrusion 78 can lock the linear portion 34 from the outside in the extending direction thereof, it is possible to prevent the linear portion 34 from being offset in the extending direction of the groove 75.

Figure 18A:
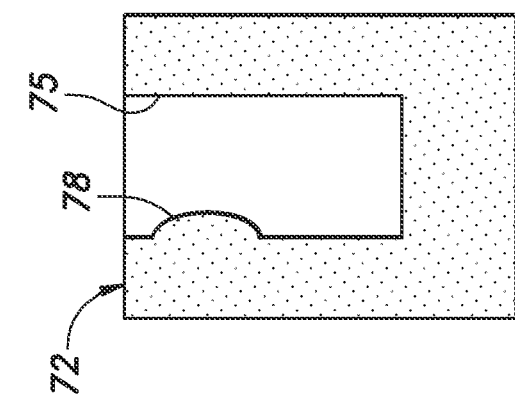
FIGS. 18A to 18D are cross-sectional views each showing a groove of a pad (in a cross-section perpendicular to an extending direction of the groove) according to a modified embodiment of a shape of each protrusion of the fourth embodiment.
Figure 18B:
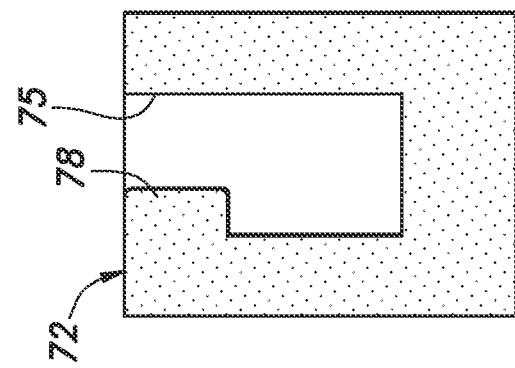
Figure 18C:
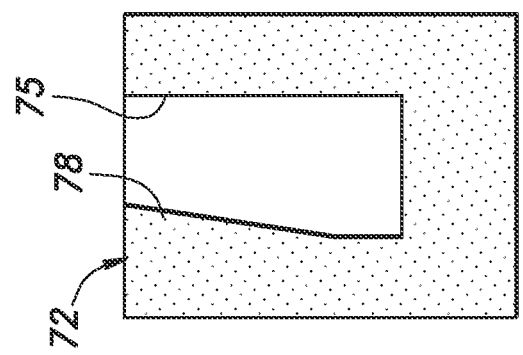
Figure 18D:
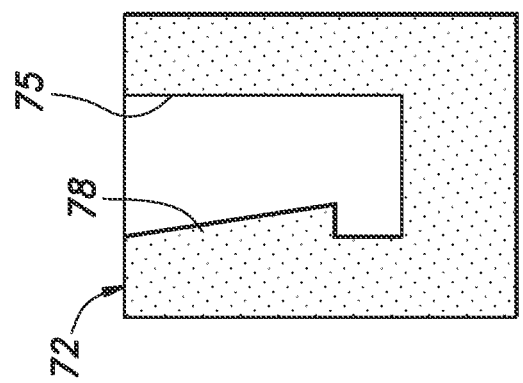

FIGS. 18A to 18B each show a modified embodiment of a shape of each protrusion 78. A protruding surface of the protrusion 78 may be round when viewed in the extending direction of the groove 75 (FIG. 18A). The protrusion 78 may extend so as to reach an opening of the groove 75 in the depth direction of thereof (FIGS. 18B to 18D). The protruding surface of the protrusion 78 may incline such that a protruding width thereof decreases toward the bottom of the groove 75 (FIG. 18C) or the protruding width thereof increases toward the bottom of the groove 75 (FIG. 18D) when viewed in the extending direction of the groove 75.

Figure 19:
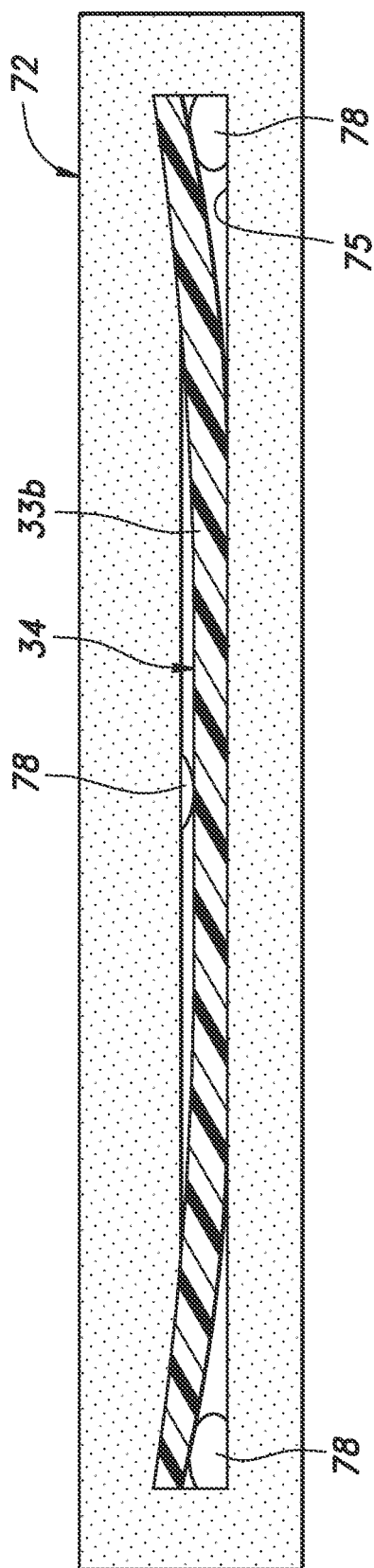
FIG. 19 is a cross-sectional view showing a pad and a linear portion (in a cross-section perpendicular to the thickness direction of the pad) according to a modified embodiment of arrangements of protrusions of the fourth embodiment.

FIG. 19 shows a modified embodiment of arrangements of the protrusions 78. Each protrusion 78 is in contact with main surfaces of the skin connecting portion 33b of the skin material 33. The protrusions 78 are arranged not only at both ends in the extending direction of the main surfaces but also at an intermediate portion in the extending direction thereof. The plurality of protrusions 78 include protrusions 78 protruding from one side surface of the groove 75 and a protrusion 78 protruding from the other side surface thereof. Preferably, the protrusions 78 protruding from the one side surface and the protrusion 78 protruding from the other side surface are arranged alternately. In this modified embodiment, a frictional force between the protrusions 78 and the skin connecting portion 33b prevents the linear portion 34 from being offset in the extending direction of the groove 75.

Figure 20:
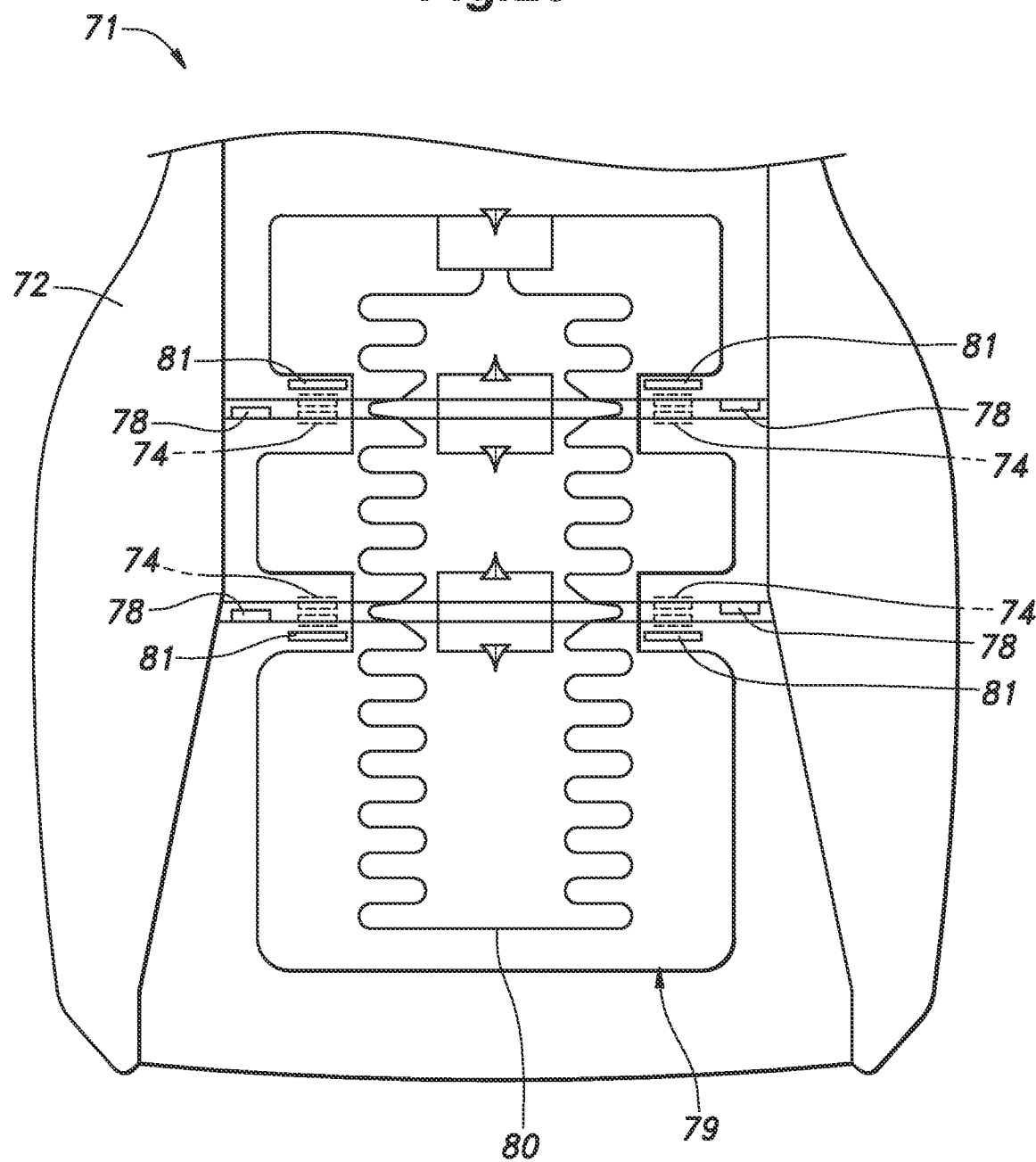
FIG. 20 is a plan view showing a pad and a heater element according to a modified embodiment of the fourth embodiment.

FIG. 20 shows the pad 72 and a heater element 79 in a case where a seat heater is applied to the vehicle seat 71 according to the fourth embodiment. The heater element 79 includes a cloth and a heater wire 80 provided along a surface of the cloth. The heater element 79 is attached to a surface of the pad 72 on the surface side with an adhesive or the like. When viewed in the thickness direction of the pad 72, the clips 74 and the protrusions 78 are offset from the heater element 79.

A mold (not shown) used at the foaming of the pad 72 has an inclining lower cavity surface and ridges extending linearly so as to perpendicularly cross an inclining direction of the inclining lower cavity surface, and the clips 74 are attached to an upper cavity surface provided at an upper side of the ridges in the inclining direction. A foaming resin material for the pad 72 is individually injected into areas separated by the ridges, and the volume of the foaming resin material for the pad 72 increases as the foaming resin material foams and hardens. Defects such as voids are likely to occur in a portion where the foaming resin material arrives later than the other portions. However, since the foaming resin material is individually injected, the difference in the arrival times of the foaming resin material becomes small, and defects such as voids are unlikely to occur. Accordingly, defects such as voids are unlikely to occur around the clips 74, so that the clips 74 can be firmly fixed to the pad 72.

Since the mold includes the ridges, the pad 72 has recesses 81 having a shape corresponding to the ridges. The recesses 81 are offset from the heater element 79 when viewed in the thickness direction of the pad 72 so as not to obstruct the adhesion between the heater element 79 and the pad 72.

FIGS. 21 to 24 show modified embodiments relating to the shapes and orientations of the clips 10 of the vehicle seat 71 according to the fourth embodiment. Incidentally, in these modified embodiments, the clips 10 according to the first embodiment are used instead of the clips 74, but the clips 35 or 74 may be used in these modified embodiments.

Figure 21:
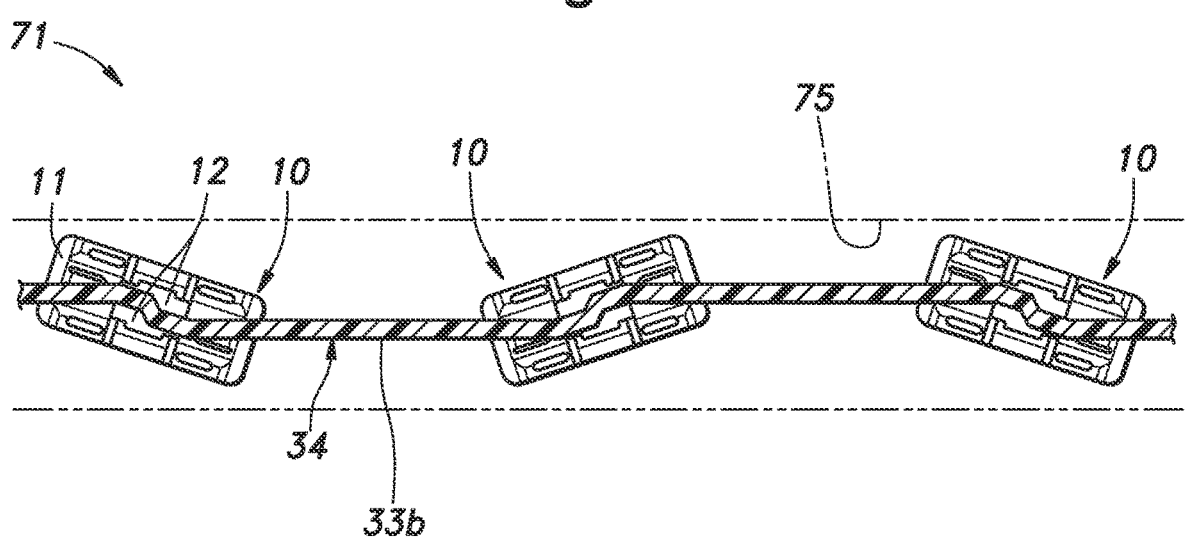
FIG. 21 is a plan view showing a pad and skin locking clips according to a modified embodiment about orientations of the skin locking clips of the fourth embodiment.

FIG. 21 is a schematic view of the groove 75 viewed from a side of an opening. A plurality of clips 10 are arranged such that an axis of each clip 10 in the longitudinal direction thereof is alternately inclined left and right in the width direction (lateral direction) of the groove 75. Accordingly, the linear portion 34 engaging with the clips 10 is bent, the frictional force between the linear portion 34 and the clips 10 is increased, so that an offset of the linear portion 34 in the extending direction thereof can be suppressed.

Figure 22:
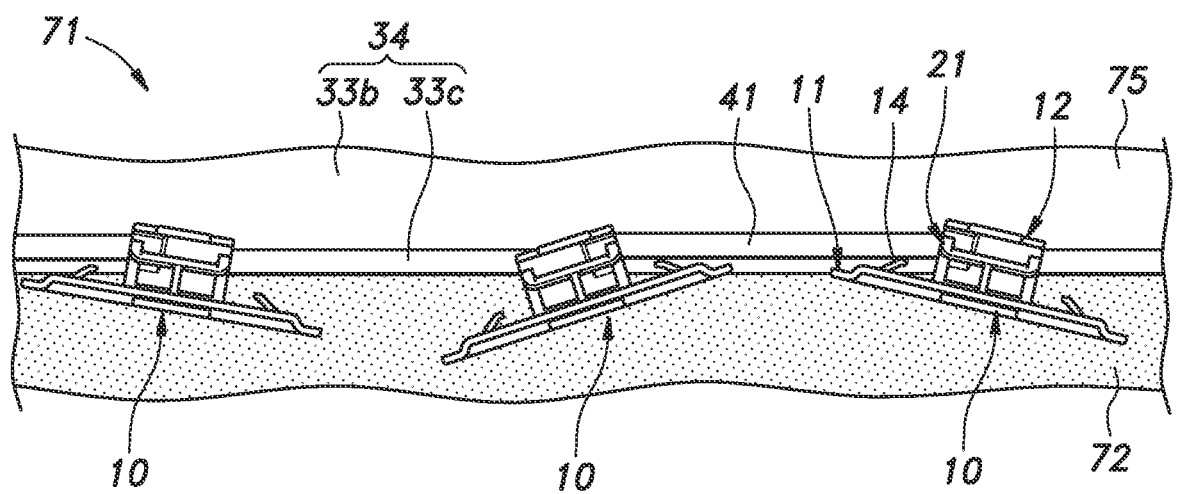
FIG. 22 is a partial cross-sectional side view showing a pad and skin locking clips according to another modified embodiment about orientations of the skin locking clips of the fourth embodiment.

FIG. 22 is a side view of the linear portion 34 and the clips 10, and a cross-section of the groove 75 is shown therein. The plurality of clips 10 are arranged such that the axis of each clip 10 in the longitudinal direction thereof is alternately inclined oppositely in the thickness direction of the pad 72. Accordingly, the linear portion 34 engaging with the clips 10 is bent, the frictional force between the linear portion 34 and the clips 10 is increased, so that an offset of the linear portion 34 in the extending direction thereof can be suppressed.

Figure 23:
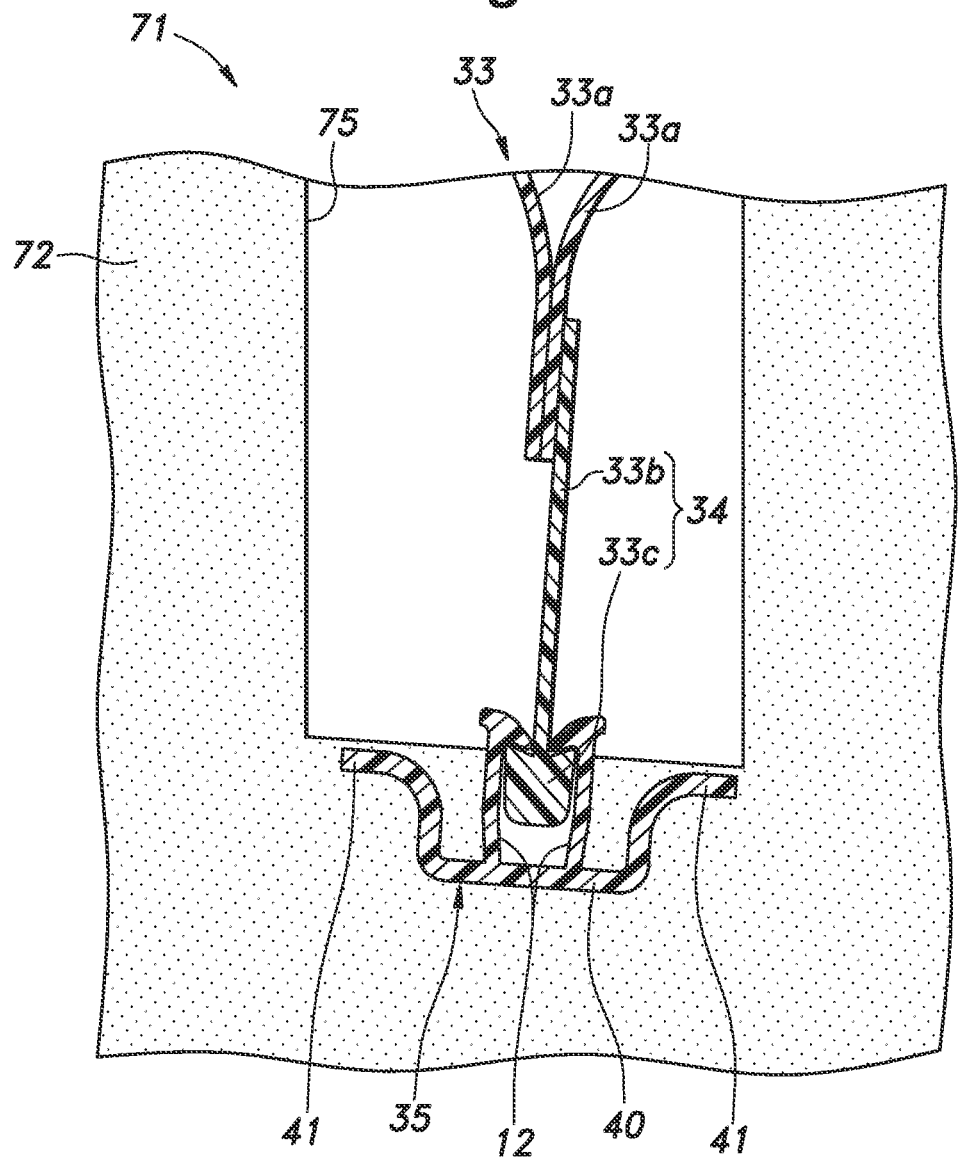
FIG. 23 is a partial cross-sectional side view showing a pad and a skin locking clip according to another modified embodiment about an orientation of the skin locking clip of the fourth embodiment.
Figure 24:
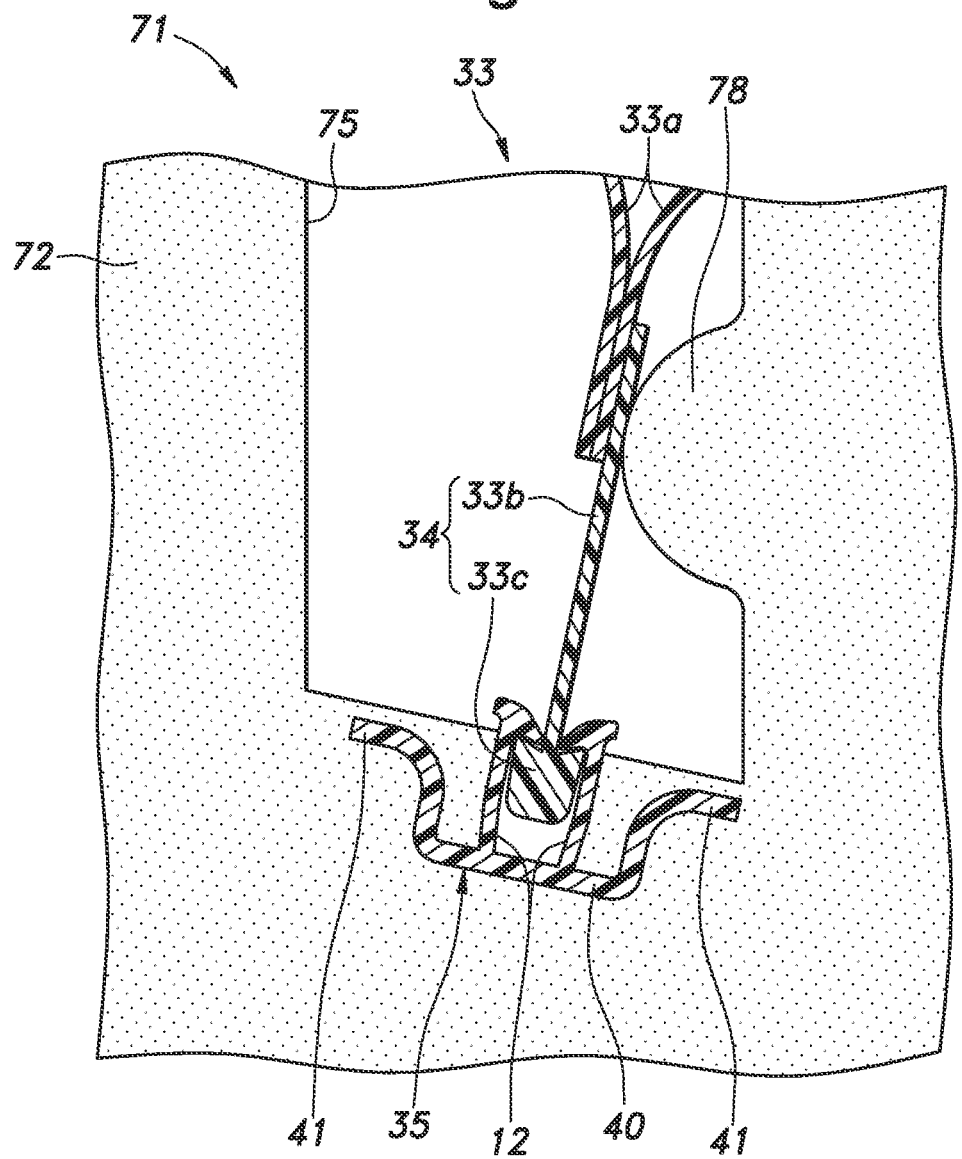
FIG. 24 is a partial cross-sectional side view showing a pad and a skin locking clip according to another modified embodiment about an orientation of the skin locking clip of the fourth embodiment.

FIGS. 23 and 24 are sectional views along a cross-section perpendicular to the extending direction of the groove 75. Incidentally, in these modified embodiments, the clip 35 of the second and third embodiments is used instead of the clip 74, but the clip 10 or 74 may be used in these modified embodiments. The clip 35 is arranged such that an axis in the thickness direction (the up-and-down direction relating to the clip 35 arranged in the seat cushion 2 (see FIG. 1)) inclines with respect to the width direction of the groove 75. Accordingly, the linear portion 34 is likely to be in contact with the side surface of the groove 75 or the protrusions 78, so that an offset of the linear portion 34 in the extending direction thereof can be suppressed by the frictional force between the linear portion 34 and the side surface of the groove 75 or the protrusions 78.

Figure 25:
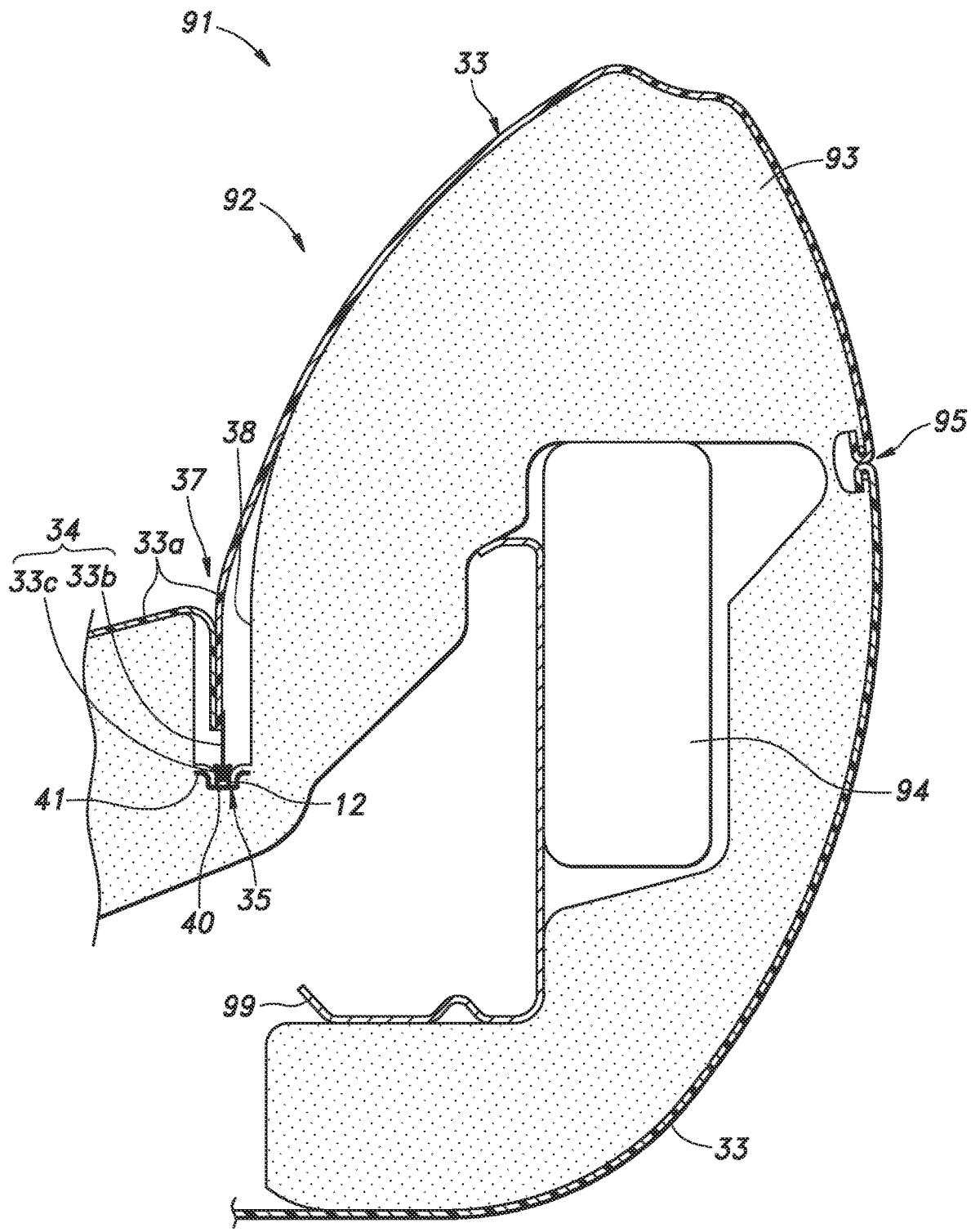
FIG. 25 is a horizontal cross-sectional view showing a side portion of a seat back of a vehicle seat according to a fifth embodiment.

FIG. 25 shows a horizontal cross-section of a side portion of a seat back 92 of a vehicle seat 91 according to a fifth embodiment. The common configurations in the above embodiments and the fifth embodiment will be provided with common reference numerals, and the descriptions thereof will be omitted. The seat back 92 includes a frame 99, a pad 93 supported by the frame 99, a skin material 33 covering a surface side of the pad 93 at a side portion of the seat back 92, clips 35 embedded in the pad 93 and configured to tuck in a prescribed linear portion 34 of the skin material 33, and an airbag 94 provided inside the side portion of the seat back 92. The pad 93 has the groove 38 at a position corresponding to the tuck-in portion 37.

When the airbag 94 expands, the pressure thereof causes a cleavable portion 95 provided on the side portion of the seat back 92 to open, and thus the airbag 94 deploys toward an outside of the seat back 92. In the cleavable portion 95, two portions of the skin material 33 are connected to each other in a cleavable state. When the airbag 94 expands, a tensile force is applied to the skin material 33 so as to cleave the cleavable portion 95, and thus each clip 35 receives a force in a direction of causing the clip 35 to disengage from the pad 93 via the locked portion 33c of the skin material 33. If the clip 35 disengages from the pad 93 before the cleavable portion 95 is cleaved, the tensile force applied to the skin material 33 decreases, and thus is not effectively transmitted to the cleavable portion 95, which may cause poor deployment of the airbag 94. To prevent such deployment failure, various measures have been taken conventionally. An object of the present embodiment is to provide a vehicle seat 91 which can prevent such deployment failure with a relatively simple configuration.

The airbag 94 is provided on one lateral side of the seat back 92, and is not provided on the other lateral side thereof. The base plate 40 of the clip 35, which receives the load at the expansion of the airbag 94, is larger, and preferably longer in the extending direction of the groove 38 and thicker, than the base plate 40 of the clip 35 arranged on the other lateral side where the airbag 94 is not provided. Accordingly, even if receiving the load at the deployment of the airbag 94, each clip 35 is less likely to disengage from the pad 93 since the force to support the clip 35 by the pad 93 is large.

Figure 26:
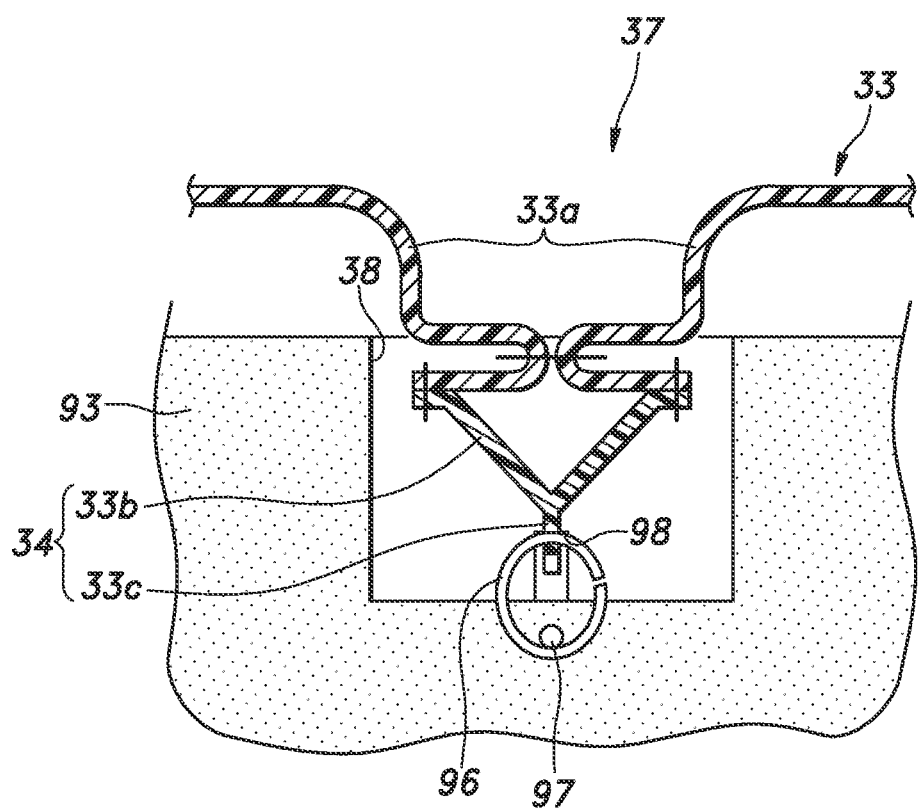
FIG. 26 is a cross-sectional view of a tuck-in portion showing a modified embodiment of an engaging means of a skin locking material and a pad according to the fifth embodiment.

FIG. 26 is a lateral cross-sectional view around the groove 38 of the vehicle seat 91 according to a modified embodiment of the fifth embodiment. In FIG. 26, a c-ring 96 is used instead of the clip 74. The c-ring 96 engages with the locked portion 33c and a linear member 97 such as a wire arranged inside the pad 93 along the extending direction of the groove 38. A hole 98 through which the c-ring 96 passes is provided at a portion of the skin connecting portion 33b adjacent to the locked portion 33c. The configuration for connecting the skin connecting portion 33b and the main body portion 33a may be the same as the above-mentioned embodiments, but the skin connecting portion 33b having a Y-shape in a cross-section crossing perpendicularly to the extending direction thereof may be connected to the main body portion 33a at two ends of the Y shape, as shown in FIG. 26. The locked portion 33c may have the same configuration as the above embodiments, but a shape of the locked portion 33c in a horizontal cross-section may be simpler than that of the above embodiments, such as a rectangle or a circle shown in FIG. 26. The force to hold the c-ring 96 by the pad 93 and the linear member 97 is greater than the force to hold the clip 74 by the pad 93. Accordingly, the c-ring 96 is unlikely to disengage from the pad 93 even if receiving the load at the deployment of the airbag 94.

FIG. 27 shows a tuck-in portion 102 of a vehicle seat 101 according to a sixth embodiment. The vehicle seat 101 includes a pad 32, a skin material 33 covering a surface side of the pad 32 in the thickness direction thereof, clips 10 embedded in the pad 32 and configured to tuck in a prescribed linear portion 34 of the skin material 33, cloth-shaped first hook and loop fastener 103 extending from a main body portion 33a, a skin connecting portion 33b, or a locked portion 33c of the skin material 33, and second hook and loop fasteners 104 fixed to a bottom of a groove 38 of the pad 32 and engaging with the first hook and loop fastener 103.

A plurality of clips 10 are arranged on the bottom of the groove 38 so as to be separated from each other, and the second hook and loop fasteners 104 are arranged between the clips 10 adjacent to each other. Marks 105 are provided on the skin connecting portion 33b at positions corresponding to the clips 10.

If only the first and second hook and loop fasteners 103 and 104 are used as a means for tucking in the skin material 33 without using the clips 10, the position of the skin material 33 is likely to be offset in the extending direction of the groove 38. By using both the clips 10 and the first and second hook and loop fasteners 103 and 104 as the means for tucking in the skin material 33, the offset of the skin material 33 can be suppressed. Further, by using both the clips 10 and the first and second hook and loop fasteners 103 and 104 as the means for tucking in the skin material 33, the number of clips 10 and the weight of the vehicle seat 101 can be reduced as compared with a case where only the clips 10 are used. Further, the worker inserts the linear portion 34 into the groove 38 so that the marks 105 and the clips 10 match each other, and thus it is possible to suppress the offset of the position of the skin material 33.

The present invention has been described in terms of specific embodiments, but is not limited by such embodiments, and can be modified in various ways. The present invention can be applied not only to the vehicle seat but also to a seat for a transportation means other than a vehicle. The stepped portion may be modified so as to be recessed downward. The overhanging pieces of the first embodiment may be modified such that the wall body of each locking piece functions as the erected portion, and the overhanging portion extends from the wall body of the locking piece toward the outside in the width direction. The linear bulging portion of the third embodiment may be provided on only one side of the groove, the other side of the pad may not include the intermediate layer member and the surface layer member, and almost the entirety of the main body member may have substantially the same thickness as the linear bulging portion. The skin locking clip of the first embodiment may be applied to the vehicle seat of one of the second to sixth embodiments, the skin locking clip of one of the second, third, fifth and sixth embodiments may be applied to the vehicle seat of the fourth embodiment, and the skin locking clip of the fourth embodiment may be applied to the vehicle seat of one of the second, third, fifth and sixth embodiments. The entire contents of the basic application of the present application for which the priority is claimed under the Paris Convention and the entire contents of the prior arts cited in this application are incorporated herein by reference.

Glossary of Terms

1, 31, 51, 71, 91, 101: vehicle seat
5, 32, 52, 72, 93: pad
6, 33: skin material
34: linear portion
10, 35, 74: skin locking clip
11, 40, 76: base plate
12, 77: locking piece
37, 57, 73, 102: tuck-in portion
55: air passage
56: main body member
57: intermediate layer member
58: surface layer member
59: linear bulging portion

The invention claimed is:

1. A vehicle seat, comprising:
a pad having an air passage;
a skin material covering a surface side of the pad in a thickness direction thereof; and
a skin locking clip embedded in the pad and configured to tuck in a prescribed linear portion of the skin material,
wherein the pad includes:
a main body member in which the skin locking clip is embedded;
an intermediate layer member arranged on the main body member and defining a portion of the air passage; and
a surface layer member arranged on the intermediate layer member and defining the portion of the air passage from the surface side, and
the main body member includes a linear bulging portion extending along the linear portion and bulging so as to define a plane substantially identical to a surface of the surface side of the surface layer member and being arranged between the linear portion and the intermediate and surface layer members, and the skin material is tucked in by the skin locking clip at a portion extending further from the surface layer member than the linear bulging portion.

2. The vehicle seat according to claim 1, wherein a linear shelf surface extending along the linear bulging portion is provided on one side of the linear bulging portion opposite to another side of the linear bulging portion where the skin material is tucked in, and a first side surface arranged on a base side of the linear shelf surface of the linear bulging portion and a second side surface arranged on a tip side of the linear shelf surface of the linear bulging portion are defined, and
the intermediate layer member is arranged such that an edge thereof is substantially in contact with the first side surface, and the surface layer member is arranged such that an edge thereof is substantially in contact with the second side surface.

3. The vehicle seat according to claim 2, wherein a portion of the skin locking clip embedded in the main body member is arranged closer to the linear portion than an extension surface of the second side surface.

4. The vehicle seat according to claim 1, wherein the skin locking clip includes a base plate embedded in the main body member and a locking piece extending from the base plate toward the surface side in the thickness direction and engaging with the linear portion, and an extending end of the locking piece is not embedded in the pad, and is arranged closer to the surface side in the thickness direction than a bottom surface of the surface layer member.

5. An assembling method for a vehicle seat including a pad having an air passage, a skin material covering a surface side of the pad in a thickness direction thereof, and a skin locking clip embedded in the pad and configured to tuck in a prescribed linear portion of the skin material, the assembling method being used for assembling the pad, the skin material, and the skin locking clip and comprising;
forming the pad in which the skin locking clip is embedded;
arranging the pad at a prescribed position; and
causing the skin locking clip to lock the linear portion of the skin material,
wherein the pad includes:
a main body member in which the skin locking clip is embedded;
an intermediate layer member arranged on the main body member and defining a portion of the air passage; and a surface layer member arranged on the intermediate layer member and defining the portion of the air passage from the surface side, and the main body member includes a linear bulging portion extending along the linear portion and bulging so as to define a plane substantially identical to a surface of the surface side of the surface layer member and being arranged between the linear portion and the intermediate and surface layer members, and the skin material is tucked in by the skin locking clip at a portion extending further from the surface layer member than the linear bulging portion.

6. The assembling method according to claim 5, wherein in the step of forming the pad, providing a linear shelf surface extending along the linear bulging portion on one side of the linear bulging portion opposite to another side of the linear bulging portion where the skin material is tucked in so as to define a first side surface arranged on a base side of the linear shelf surface of the linear bulging portion and a second side surface arranged on a tip side of the linear shelf surface of the linear bulging portion, and in the step of arranging the pad, arranging the intermediate layer member such that an edge thereof is substantially in contact with the first side surface, and arranging the surface layer member such that an edge thereof is substantially in contact with the second side surface.

7. The assembling method according to claim 6, wherein in the step of forming the pad, arranging a portion of the skin locking clip embedded in the main body member closer to the linear portion than an extension surface of the second side surface.

8. The assembling method according to claim 5, wherein the skin locking clip includes a base plate embedded in the main body member and a locking piece extending from the base plate toward the surface side in the thickness direction and engaging with the linear portion, and in the step of forming the pad, arranging an extending end of the locking piece closer to the surface side in the thickness direction than a bottom surface of the surface layer member without embedding the extending end thereof in the pad.

\* \* \* \* \*